(12) United States Patent
Bergh et al.

(10) Patent No.: US 11,829,044 B2
(45) Date of Patent: Nov. 28, 2023

(54) ELECTROCHROMIC MULTI-LAYER DEVICES WITH SPATIALLY COORDINATED SWITCHING

(71) Applicant: HALIO, INC., Hayward, CA (US)

(72) Inventors: Howard S. Bergh, Hayward, CA (US); John David Bass, Hayward, CA (US); Jonathan Ziebarth, Hayward, CA (US); Nicolas Timmerman, Hayward, CA (US); Zachariah Hogan, Hayward, CA (US); Karin Yaccato, Hayward, CA (US); Howard W. Turner, Hayward, CA (US)

(73) Assignee: HALIO, INC., Hayward, CA (US)

( * ) Notice: Subject to any disclaimer, the term of this patent is extended or adjusted under 35 U.S.C. 154(b) by 0 days.

(21) Appl. No.: 18/168,533

(22) Filed: Feb. 13, 2023

(65) Prior Publication Data

US 2023/0205033 A1 Jun. 29, 2023

Related U.S. Application Data

(60) Division of application No. 16/594,948, filed on Oct. 7, 2019, now Pat. No. 11,579,508, which is a continuation of application No. 15/818,564, filed on Nov. 20, 2017, now Pat. No. 10,437,128, which is a division of application No. 14/685,759, filed on Apr. 14, 2015, now Pat. No. 9,823,536, which is a continuation of application No. 14/222,860, filed on Mar. 24, 2014, now Pat. No. 9,036,242, which is a continuation of application No. 13/370,268, filed on Feb. 9, 2012, now Pat. No. 8,717,658.

(60) Provisional application No. 61/440,964, filed on Feb. 9, 2011.

(51) Int. Cl.
| | |
|---|---|
| G02F 1/155 | (2006.01) |
| G02F 1/1343 | (2006.01) |
| G02F 1/1523 | (2019.01) |
| G02F 1/1514 | (2019.01) |
| G02F 1/153 | (2006.01) |

(52) U.S. Cl.
CPC .......... *G02F 1/155* (2013.01); *G02F 1/13439* (2013.01); *G02F 1/153* (2013.01); *G02F 2001/15145* (2019.01); *G02F 2201/122* (2013.01); *Y10S 359/90* (2013.01)

(58) Field of Classification Search
CPC ........ G02F 1/155; G02F 1/1523; G02F 1/153; G02F 2001/1512; G02F 2201/122; G02F 1/13439
See application file for complete search history.

(56) References Cited

U.S. PATENT DOCUMENTS

| 10,437,128 B2 | 10/2019 | Bergh et al. |
| 2020/0033685 A1 | 1/2020 | Bergh et al. |

*Primary Examiner* — Jack Dinh

(57) ABSTRACT

A multi-layer device comprising a first substrate and a first electrically conductive layer on a surface thereof, the first electrically conductive layer having a sheet resistance to the flow of electrical current through the first electrically conductive layer that varies as a function of position.

8 Claims, 16 Drawing Sheets

ELECTROCHROMIC MULTI-LAYER DEVICES WITH SPATIALLY COORDINATED SWITCHING

FIELD OF THE INVENTION

The present invention generally relates to switchable electrochromic devices, such as architectural windows, capable of coordinated switching over substantially their entire area or a selected subregion of their entire area. More particularly, and in one preferred embodiment, the present invention is directed to switchable electrochromic multi-layer devices, particularly large area rectangular windows for architectural applications that switch in a spatially coordinated manner over substantially their entire area or a selected subregion of their entire area; optionally these are of non-uniform shape, optionally they switch synchronously, i.e., uniformly, over substantially their entire area or a selected subregion of their entire area, or in a coordinated but nonsynchronous manner (e.g., from side-to-side, or top-to-bottom) from a first optical state, e.g., a transparent state, to a second optical state, e.g., a reflective or colored state.

BACKGROUND OF THE INVENTION

Commercial switchable glazing devices are well known for use as mirrors in motor vehicles, automotive windows, aircraft window assemblies, sunroofs, skylights, architectural windows. Such devices may comprise, for example, inorganic electrochromic devices, organic electrochromic devices, switchable mirrors, and hybrids of these having two conducting layers with one or more active layers between the conducting layers. When a voltage is applied across these conducting layers the optical properties of a layer or layers in between change. Such optical property changes are typically a modulation of the transmissivity of the visible or the solar subportion of the electromagnetic spectrum. For convenience, the two optical states will be referred to as a lightened state and a darkened state in the following discussion, but it should be understood that these are merely examples and relative terms (i.e., one of the two states is "lighter" or more transmissive than the other state) and that there could be a set of lightened and darkened states between the extremes that are attainable for a specific electrochromic device; for example, it is feasible to switch between intermediate lightened and darkened states in such a set.

Switching between a lightened and a darkened state in relatively small electrochromic devices such as an electrochromic rear-view mirror assembly is typically quick and uniform, whereas switching between the lightened and darkened state in a large area electrochromic device can be slow and spatially non-uniform. Gradual, non-uniform coloring or switching is a common problem associated with large area electrochromic devices. This problem, commonly referred to as the "iris effect," is typically the result of the voltage drop through the transparent conductive coatings providing electrical contact to one side or both sides of the device. For example, when a voltage is initially applied to the device, the potential is typically the greatest in the vicinity of the edge of the device (where the voltage is applied) and the least at the center of the device; as a result, there may be a significant difference between the transmissivity near the edge of the device and the transmissivity at the center of the device. Over time, however, the difference in applied voltage between the center and edge decreases and, as a result, the difference in transmissivity at the center and edge of the device decreases. In such circumstances, the electrochromic medium will typically display non-uniform transmissivity by initially changing the transmissivity of the device in the vicinity of the applied potential, with the transmissivity gradually and progressively changing towards the center of the device as the switching progresses. While the iris effect is most commonly observed in relatively large devices, it also can be present in smaller devices that have correspondingly higher resistivity conducting layers.

SUMMARY OF THE INVENTION

Among the various aspects of the present invention is the provision of relatively large-area electrochromic multi-layer devices capable of coordinated switching and coloring, across substantially its entire area that can be easily manufactured.

Briefly, therefore, the present invention is directed to a multi-layer device comprising a first substrate and a first electrically conductive layer on a surface thereof. The first electrically conductive layer is transmissive to electromagnetic radiation having a wavelength in the range of infrared to ultraviolet and has a sheet resistance, $R_s$, to the flow of electrical current through the first electrically conductive layer that varies as a function of position in the first electrically conductive layer wherein the ratio of the value of maximum sheet resistance, $R_{max}$, to the value of minimum sheet resistance, $R_{min}$, in the first electrically conductive layer is at least 2.

Another aspect of the present invention is a multi-layer device comprising a first substrate and a first electrically conductive layer on a surface thereof. The first electrically conductive layer has a spatially varying sheet resistance, $R_s$, to the flow of electrical current through the first electrically conductive layer that varies as a function of position in the first electrically conductive layer wherein the ratio of the value of maximum sheet resistance, $R_{max}$, to the value of minimum sheet resistance, $R_{min}$, in the first electrically conductive layer is at least about 1.25.

Another aspect of the present invention is a multi-layer device comprising a first substrate, a first electrically conductive layer on a surface of that substrate, and a first electrode layer on a surface of the first electrically conductive layer. The first electrically conductive layer has a spatially varying sheet resistance, $R_s$, that varies as a function of position in the first electrically conductive layer wherein the ratio of the value of maximum sheet resistance, $R_{max}$, to the value of minimum sheet resistance, $R_{min}$, in the first electrically conductive layer is at least about 1.25.

Another aspect of the present invention is a multi-layer device comprising a first substrate and a first electrically conductive layer on a surface of the substrate. The first electrically conductive layer has a spatially varying sheet resistance, $R_s$, that varies as a function of position in the first electrically conductive layer wherein a contour map of the sheet resistance, $R_s$, as a function of position within the first electrically conductive layer contains a set of isoresistance lines and a set of resistance gradient lines normal to the isoresistance lines. The sheet resistance along a gradient line in the set generally increases, generally decreases, generally increases until it reaches a maximum and then generally decreases, or generally decreases until it reaches a minimum and then generally increases. In one embodiment, for example, the gradient in sheet resistance is a constant. By way of further example, in one embodiment, the gradient in sheet resistance is a constant and the substrate is rectangular in shape.

Another aspect of the present invention is a multi-layer device comprising a first substrate, a first electrically conductive layer on a surface of the substrate, and a first electrode layer on a surface of the first electrically conductive layer. The first electrically conductive layer has a spatially varying sheet resistance, $R_s$, that varies as a function of position in the first electrically conductive layer wherein a contour map of the sheet resistance, $R_s$, as a function of position within the first electrically conductive layer contains a set of isoresistance lines and a set of resistance gradient lines normal to the isoresistance lines. The sheet resistance along a gradient line in the set generally increases, generally decreases, generally increases until it reaches a maximum and then generally decreases, or generally decreases until it reaches a minimum and then generally increases. In one embodiment, for example, the gradient in sheet resistance is a constant. By way of further example, in one embodiment, the gradient in sheet resistance is a constant and the substrate is rectangular in shape Another aspect of the present invention is an electrochromic multi-layer device comprising an electrochromic layer between and in electrical contact with a first and a second electrically conductive layer. The first and/or second electrically conductive layers have a spatially varying sheet resistance, $R_s$, that varies as a function of position in the first and/or second electrically conductive layer(s) wherein a contour map of the sheet resistance, $R_s$, as a function of position within the first and/or second electrically conductive layer(s) contains a set of isoresistance lines and a set of resistance gradient lines normal to the isoresistance lines. The sheet resistance along a gradient line in the first and/or second electrically conductive layer(s) generally increase(s), generally decrease(s), generally increase(s) until it reaches a maximum and then generally decrease(s), or generally decrease(s) until it reaches a minimum and then generally increase(s). In one embodiment, for example, the gradient in sheet resistance is a constant. By way of further example, in one embodiment, the gradient in sheet resistance is a constant and the substrate is rectangular in shape A further aspect of the present invention is an electrochromic device comprising a first substrate, a first electrically conductive layer, a first electrode layer, a second electrically conductive layer and a second substrate. The first and second electrically conductive layers each have a sheet resistance, $R_s$, to the flow of electrical current through the first and second electrically conductive layers that varies as a function of position in the first and second electrically conductive layers, respectively, wherein the ratio of the value of maximum sheet resistance, $R_{max}$, to the value of minimum sheet resistance, $R_{min}$, in the first electrically conductive layer is at least 2 and the ratio of the value of maximum sheet resistance, $R_{max}$, to the value of minimum sheet resistance, $R_{min}$, in the second electrically conductive layer is at least 2. The first substrate and the first electrically conductive layer are transmissive to electromagnetic radiation having a wavelength in the range of infrared to ultraviolet. For example, in one embodiment the first substrate and the first electrically conductive layer are transparent to electromagnetic radiation having a wavelength in the range of infrared to ultraviolet.

A further aspect of the present invention is a process for modulating the transmissivity of an electrochromic multi-layer device, the multi-layer device comprising an electrochromic layer between and in electrical contact with a first and a second electrically conductive layer. The process comprises applying a voltage pulse between the first and second electrically conductive layers, the voltage pulse having a magnitude of at least about 2 volts. The voltage pulse induces the electrochromic layer to switch from a first to a second optical state wherein the first or second optical state has a greater transmissivity to electromagnetic radiation having a wavelength in the range of ultraviolet to infrared wavelengths relative to the other optical state, and the second optical state persists at least 1 second after the pulse and in the absence of a voltage applied between the electrically conductive layers.

A further aspect of the present invention is a process for the preparation of a multi-layer device, the process comprises forming a first electrically conductive layer on a surface of a first substrate. The first electrically conductive layer comprises a transparent conductor and has a spatially varying sheet resistance, $R_s$, to the flow of electrical current through the first electrically conductive layer that varies as a function of position in the first electrically conductive layer wherein the ratio of the value of maximum sheet resistance, $R_{max}$, to the value of minimum sheet resistance, $R_{min}$, in the first electrically conductive layer is at least about 1.25

A further aspect of the present invention is a process for the preparation of a multi-layer device. The process comprises forming a multilayer structure comprising an electrochromic layer, an electrically conductive layer and a substrate, the electrically conductive layer being between the first electrode layer and the substrate. The first electrically conductive layer has a spatially varying sheet resistance, $R_s$, to the flow of electrical current through the first electrically conductive layer that varies as a function of position in the first electrically conductive layer wherein the ratio of the value of maximum sheet resistance, $R_{max}$, to the value of minimum sheet resistance, $R_{min}$, in the first electrically conductive layer is at least about 1.25

A further aspect of the present invention is directed to a process for the preparation of a multi-layer device. The process comprises forming a multi-layer layer structure comprising an electrochromic layer between and in electrical contact with a first and a second electrically conductive layer. The first and/or the second electrically conductive layer has a spatially varying sheet resistance, $R_s$, to the flow of electrical current through the first and/or the second electrically conductive layer that varies as a function of position in the first and/or the second electrically conductive layer, respectively, wherein the ratio of the value of maximum sheet resistance, $R_{max}$, to the value of minimum sheet resistance, $R_{min}$, in the first and/or the second electrically conductive layer is at least about 1.25, respectively.

Other objects and features will be in part apparent and in part pointed out hereinafter.

Figure 1:
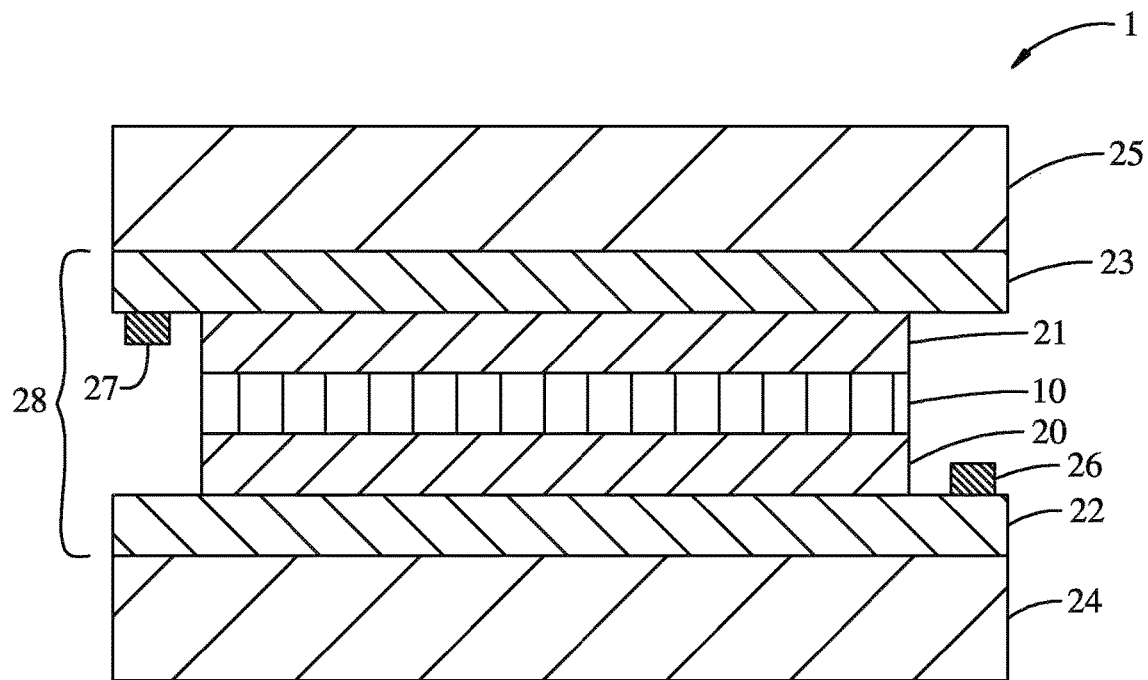
FIG. 1 is a schematic cross-section of a multi-layer electrochromic device of the present invention.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

ABBREVIATIONS AND DEFINITIONS

The following definitions and methods are provided to better define the present invention and to guide those of ordinary skill in the art in the practice of the present invention. Unless otherwise noted, terms are to be understood according to conventional usage by those of ordinary skill in the relevant art.

The term "anodic electrochromic layer" refers to an electrode layer that changes from a more transmissive state to a less transmissive state upon the removal of ions.

The term "cathodic electrochromic layer" refers to an electrode layer that changes from a more transmissive state to a less transmissive state upon the insertion of ions.

The terms "conductive" and "resistive" refer to the electrical conductivity and electrical resistivity of a material.

The term "convex polygon" refer to a simple polygon in which every internal angle is less than or equal to 180 degrees, and every line segment between two vertices remains inside or on the boundary of the polygon. Exemplary convex polygons include triangles, rectangles, pentagons, hexagons, etc., in which every internal angle is less than or equal to 180 degrees and every line segment between two vertices remains inside or on the boundary of the polygon.

The term "electrochromic layer" refers to a layer comprising an electrochromic material.

The term "electrochromic material" refers to materials that are able to change their optical properties, reversibly, as a result of the insertion or extraction of ions and electrons. For example, an electrochromic material may change between a colored, translucent state and a transparent state.

The term "electrode layer" refers to a layer capable of conducting ions as well as electrons. The electrode layer contains a species that can be oxidized when ions are inserted into the material and contains a species that can be reduced when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode stack.

The term "transmissive" is used to denote transmission of electromagnetic radiation through a material.

The term "transparent" is used to denote substantial transmission of electromagnetic radiation through a material such that, for example, bodies situated beyond or behind the material can be distinctly seen or imaged using appropriate image sensing technology.

DETAILED DESCRIPTION OF THE PREFERRED EMBODIMENTS

FIG. 1 depicts a cross-sectional structural diagram of electrochromic device 1 according to a first embodiment of the present invention. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 which, in turn, are arranged against outer substrates 24, 25. Elements 22, 20, 10, 21, and 23 are collectively referred to as an electrochromic stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 10 may be changed by applying a voltage pulse to electrically conductive layers 22 and 23. The pulse causes electrons and ions to move between first and second electrode layers 20 and 21 and, as a result, electrochromic material in the first and/or second electrode layer(s) change(s) optical states, thereby switching electrochromic device 1 from a more transmissive state to a less transmissive state, or from a less transmissive state to a more transmissive state. In one embodiment, electrochromic device 1 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by electrochromic materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an electrochromic device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific electrochromic device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" refers to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

The materials making up electrochromic stack 28 may comprise organic or inorganic materials, and they may be solid or liquid. For example, in certain embodiments the electrochromic stack 28 comprises materials that are inorganic, solid (i.e., in the solid state), or both inorganic and solid. Inorganic materials have shown better reliability in architectural applications. Materials in the solid state can also offer the advantage of not having containment and leakage issues, as materials in the liquid state often do. It should be understood that any one or more of the layers in the stack may contain some amount of organic material, but in many implementations one or more of the layers contains little or no organic matter. The same can be said for liquids that may be present in one or more layers in small amounts. In certain other embodiments some or all of the materials making up electrochromic stack 28 are organic. Organic ion conductors can offer higher mobilities and thus potentially better device switching performance. Organic electrochromic layers can provide higher contrast ratios and more diverse color options. Each of the layers in the electrochromic device is discussed in detail, below. It should also be understood that solid state material may be deposited or otherwise formed by processes employing liquid components such as certain processes employing sol-gels or chemical vapor deposition.

Referring again to FIG. 1, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, including soda lime float glass. The glass may be tempered or untempered. In some embodiments of electrochromic device 1 with glass, e.g. soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

In one preferred embodiment of the invention, first substrate 24 and second substrate 25 are each float glass. In certain embodiments for architectural applications, this glass is at least 0.5 meters by 0.5 meters, and can be much larger, e.g., as large as about 3 meters by 4 meters. In such applications, this glass is typically at least about 2 mm thick and more commonly 4-6 mm thick.

Independent of application, the electrochromic devices of the present invention may have a wide range of sizes. In general, it is preferred that the electrochromic device comprise a substrate having a surface with a surface area of at least 0.001 meter$^2$. For example, in certain embodiments, the electrochromic device comprises a substrate having a surface with a surface area of at least 0.01 meter$^2$. By way of further example, in certain embodiments, the electrochromic device comprises a substrate having a surface with a surface area of at least 0.1 meter$^2$. By way of further example, in certain embodiments, the electrochromic device comprises a substrate having a surface with a surface area of at least 1 meter$^2$. By way of further example, in certain embodiments, the electrochromic device comprises a substrate having a surface with a surface area of at least 5 meter$^2$. By way of further example, in certain embodiments, the electrochromic device comprises a substrate having a surface with a surface area of at least 10 meter$^2$.

At least one of the two electrically conductive layers 22, 23 is also preferably transparent in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nano particles (e.g., rods, tubes, dots) conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 μm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 1, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electric connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5Ω/□. In general, it is desirable that the sheet resistance of each of the first and second electrically conductive layers 22 and 23 be about the same. In one embodiment, first and second electrically conductive layers 22 and 23 each have a sheet resistance of about 20Ω/□ to about 8 Ω/□.

To facilitate more rapid switching of electrochromic device 1 from a state of relatively greater transmittance to a state of relatively lesser transmittance, or vice versa, at least one of electrically conductive layers 22, 23 preferably has a sheet resistance, $R_s$, to the flow of electrons through the layer that is non-uniform. For example, in one embodiment only one of first and second electrically conductive layers 22, 23 has a non-uniform sheet resistance to the flow of electrons through the layer. Alternatively, and typically more preferably, first electrically conductive layer 22 and second electrically conductive layer 23 each have a non-uniform sheet resistance to the flow of electrons through the respective layers. Without being bound by any particular theory, it is presently believed that spatially varying the sheet resistance of electrically conductive layer 22, spatially varying the sheet resistance of electrically conductive layer 23, or spatially varying the sheet resistance of electrically conductive layer 22 and electrically conductive layer 23 improves the switching performance of the device by controlling the voltage drop in the conductive layer to provide uniform potential drop or a desired non-uniform potential drop across the device, over the area of the device.

In general, electrical circuit modeling may be used to determine the sheet resistance distribution providing desired switching performance, taking into account the type of electrochromic device, the device shape and dimensions, electrode characteristics, and the placement of electrical connections (e.g., bus bars) to the voltage source. The sheet resistance distribution, in turn, can be controlled, at least in part, by grading the thickness of the first and/or second electrically conductive layer(s), grading the composition of the first and/or second electrically conductive layer(s), or patterning the first and/or second electrically conductive layer(s), or some combination of these.

In one exemplary embodiment, the electrochromic device is a rectangular electrochromic window. Referring again to FIG. 1, in this embodiment first substrate 24 and second substrate 25 are rectangular panes of glass or other transparent substrate and electrochromic device 1 has two bus bars 26, 27 located on opposite sides of first electrode layer 20 and second electrode layer 21, respectively. When configured in this manner, it is generally preferred that the resistance to the flow of electrons in first electrically conductive layer 22 increases with increasing distance from bus bar 26 and that the resistance to the flow of electrons in second electrically conductive layer 23 increases with increasing distance from bus bar 27. This, in turn, can be effected, for example, by decreasing the thickness of first electrically conductive layer 22 as a function of increasing distance from bus bar 26 and decreasing the thickness of second electrically conductive layer 23 as a function of increasing distance from bus bar 27.

The multi-layer devices of the present invention may have a shape other than rectangular, may have more than two bus bars, and/or may not have the bus bars on opposite sides of the device. For example, the multi-layer device may have a perimeter that is more generally a quadrilateral, or a shape with greater or fewer sides than four for example, the multi-layer device may be triangular, pentagonal, hexagonal, etc., in shape. By way of further example, the multi-layer device may have a perimeter that is curved but lacks vertices, e.g., circular, oval, etc. By way of further example, the multi-layer device may comprise three, four or more bus bars connecting the multi-layer device to a voltage source, or the bus bars, independent of number may be located on non-opposing sides. In each of such instances, the preferred resistance profile in the electrically conductive layer(s) may vary from that which is described for the rectangular, two bus bar configuration.

In general, however, and independent of whether the multi-layer device has a shape other than rectangular, there are more than two electrical connections (e.g., bus bars), and/or the electrical connections (e.g., bus bars) are on opposite sides of the device, the sheet resistance, $R_s$, in the first electrically conductive layer 22, in the second electrically conductive layer 23, or in the first electrically conductive layer 22 and the second electrically conductive layer 23 may be plotted to join points of equal sheet resistance (i.e., isoresistance lines) as a function of (two-dimensional) position within the first and/or second electrically conductive layer. Plots of this general nature, sometimes referred to as contour maps, are routinely used in cartography to join points of equal elevation. In the context of the present invention, a contour map of the sheet resistance, $R_s$, in the first and/or second electrically conductive layer as a function of (two-dimensional) position within the first and/or second electrically conductive layer preferably contains a series of isoresistance lines (also sometimes referred to as contour lines) and resistance gradient lines (lines perpendicular to the isoresistance lines). The sheet resistance along a gradient line in the first and/or second electrically conductive layer(s) generally increase(s), generally decrease(s), generally increase(s) until it reaches a maximum and then generally decrease(s), or generally decrease(s) until it reaches a minimum and then generally increase(s).

Figure 2A:
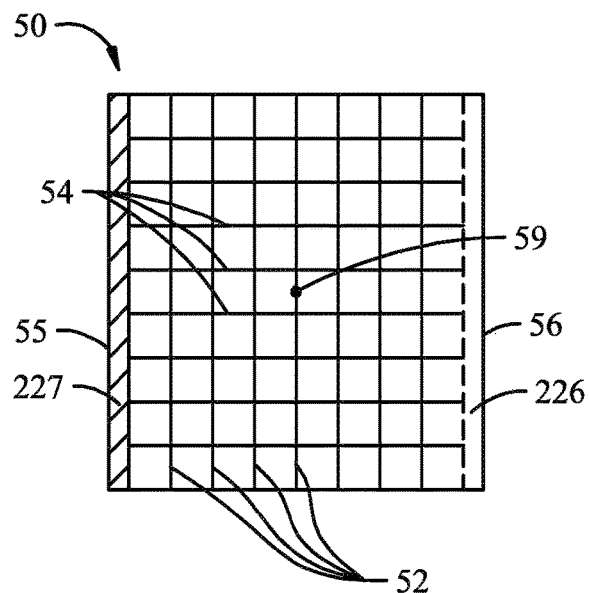
FIG. 2A-2E is a series of contour maps of the sheet resistance, $R_s$, in the first and/or second electrically conductive layer as a function of position (two-dimensional) within the first and/or second electrically conductive layer showing isoresistance lines (also sometimes referred to as contour lines) and resistance gradient lines (lines perpendicular to the isoresistance lines) resulting from various alternative arrangements of bus bars for devices having square and circular perimeters.
Figure 2B:
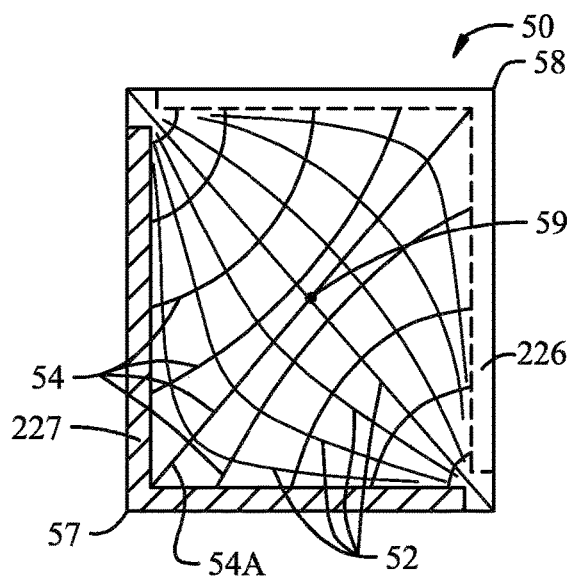
Figure 2C:
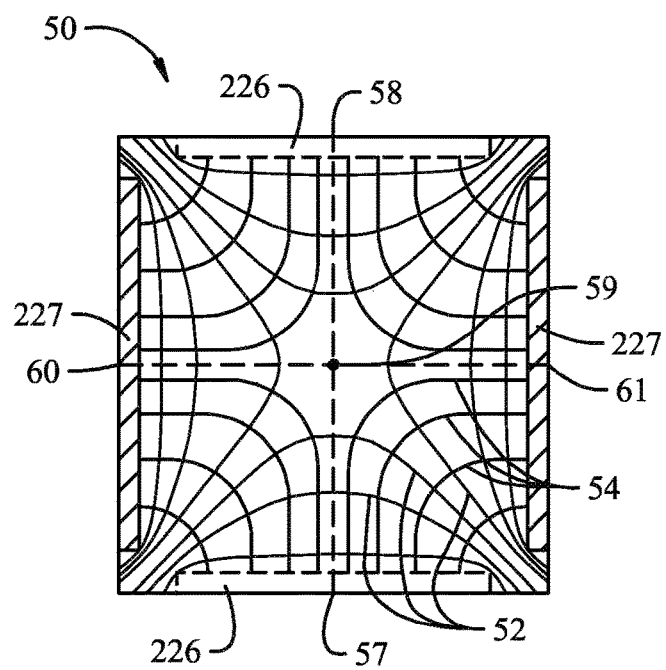
Figure 2D:
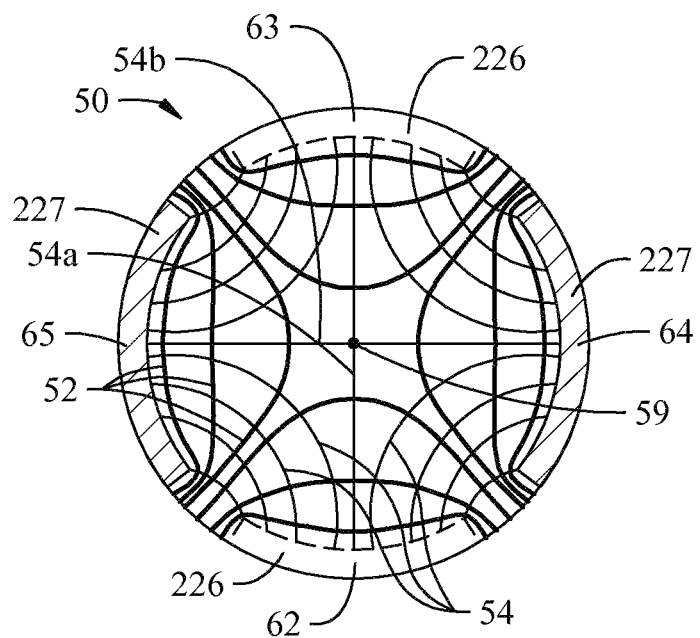
Figure 2E:
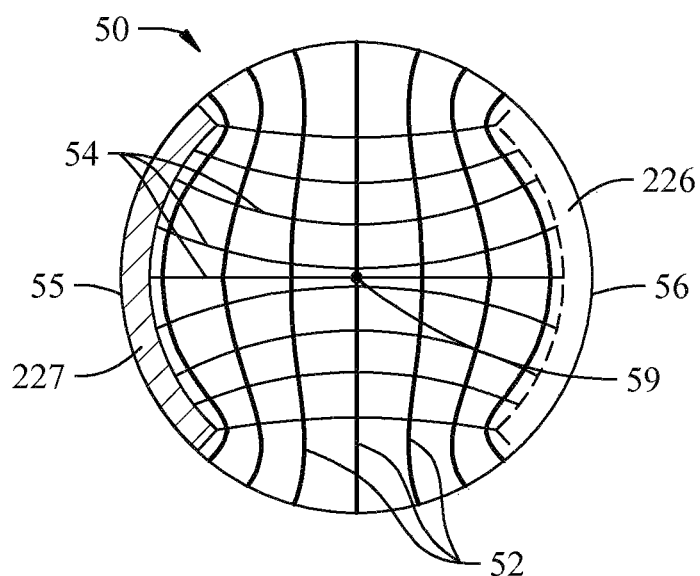

FIGS. 2A-2E depict a contour map of the sheet resistance, $R_s$, in an electrically conductive layer (i.e., the first electrically conductive layer, the second electrically conductive layer, or each of the first and second electrically conductive layers) as a function of (two-dimensional) position within the electrically conductive layer for several exemplary embodiments of an electrochromic stack in accordance with the present invention. In each of FIGS. 2A-2E, contour map 50 depicts a set of sheet isoresistance curves 52 (i.e., curves along which the sheet resistance, $R_s$, has a constant value) and a set of resistance gradient curves 54 that are perpendicular to isoresistance curves 52 resulting from an electrochromic stack having a perimeter that is square (FIGS. 2A, 2B, and 2C) or circular (FIGS. 2D and 2E) and varying numbers and locations of bus bars 226 and 227 in contact with the first and second electrically conductive layers (not labeled) of the electrochromic stack. In FIG. 2A, the direction of the set of gradients 54 indicates that the sheet resistance, $R_s$, within the electrically conductive layer progressively increases along the set of gradients 54 and between west side 55 and east side 56 of the electrically conductive layer in contact with bus bar 227. In FIG. 2B, the direction of gradient 54A indicates that the sheet resistance, $R_s$, within the electrically conductive layer in contact with bus bar 227 progressively decreases from southwest corner 57 to centroid 59 and then decreases from centroid 59 to northeast corner 58. In FIG. 2C, the direction of the set of gradients 54 indicate that the sheet resistance, $R_s$, within the electrically conductive layer in contact with bus bar 227 progressively decreases from the west side 60 and east side 61 to centroid 59 and progressively increases from the top side 58 and bottom side 57 to centroid 59; stated differently, sheet resistance, $R_s$, forms a saddle like form centered around centroid 59. In FIG. 2D, the direction of gradients 54$a$ and 54$b$ indicates that the sheet resistance, $R_s$, within the electrically conductive layer in contact with bus bar 227 progressively decreases from each of positions 64 and 65 to centroid 59 and progressively increases from each of positions 63 and 62 to centroid 59; stated differently, sheet resistance, $R_s$, forms a saddle like form centered around centroid 59. In FIG. 2E, the direction of the set of gradients 54 indicates that the sheet resistance, $R_s$, within the electrically conductive layer in contact with bus bar 227 progressively decreases from the west side 55 to the east side 56. In one embodiment, for example, the gradient in sheet resistance is a constant. By way of further example, in one embodiment, the gradient in sheet resistance is a constant and the substrate is rectangular in shape In one presently preferred embodiment, the ratio of the value of maximum sheet resistance, $R_{max}$, to the value of minimum sheet resistance, $R_{min}$, in the first electrically conductive layer is at least about 1.25. In one exemplary embodiment, the ratio of the value of maximum sheet resistance, $R_{max}$, to the value of minimum sheet resistance, $R_{min}$, in the first electrically conductive layer is at least about 1.5. In one exemplary embodiment, the ratio of the value of maximum sheet resistance, $R_{max}$, to the value of minimum sheet resistance, $R_{min}$, in the first electrically conductive layer is at least about 2. In one exemplary embodiment, the ratio of the value of maximum sheet resistance, $R_{max}$, to the value of minimum sheet resistance, $R_{min}$, in the first electrically conductive layer is at least about 3. In one exemplary embodiment, the ratio of the value of maximum sheet resistance, $R_{max}$, to the value of minimum sheet resistance, $R_{min}$, in the first electrically conductive layer is at least about 4. In one exemplary embodiment, the ratio of the value of maximum sheet resistance, $R_{max}$, to the value of minimum sheet resistance, $R_{min}$, in the first electrically conductive layer is at least about 5. In one exemplary embodiment, the ratio of the value of maximum sheet resistance, $R_{max}$, to the value of minimum sheet resistance, $R_{min}$, in the first electrically conductive layer is at least about 6. In one exemplary embodiment, the ratio of the value of maximum sheet resistance, $R_{max}$, to the value of minimum sheet resistance, $R_{min}$, in the first electrically conductive layer is at least about 7. In one exemplary embodiment, the ratio of the value of maximum sheet resistance, $R_{max}$, to the value of minimum sheet resistance, $R_{min}$, in the first electrically conductive layer is at least about 8. In one exemplary embodiment, the ratio of the value of maximum sheet resistance, $R_{max}$, to the value of minimum sheet resistance, $R_{min}$, in the first electrically conductive layer is at least about 9. In one exemplary embodiment, the ratio of the value of maximum sheet resistance, $R_{max}$, to the value of minimum sheet resistance, $R_{min}$, in the first electrically conductive layer is at least about 10.

Figure 21:
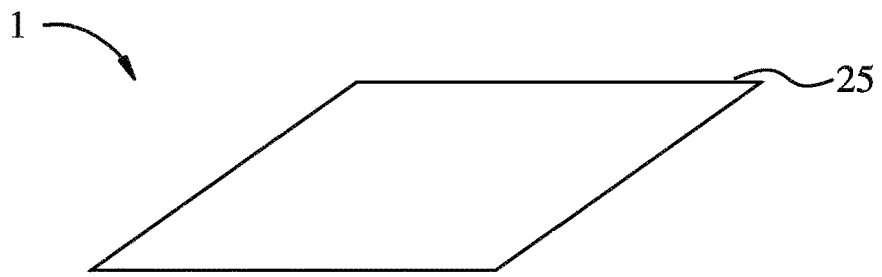
FIG. 21 is an exploded view of the multi-layer device of FIG. 1.
Figure 21:
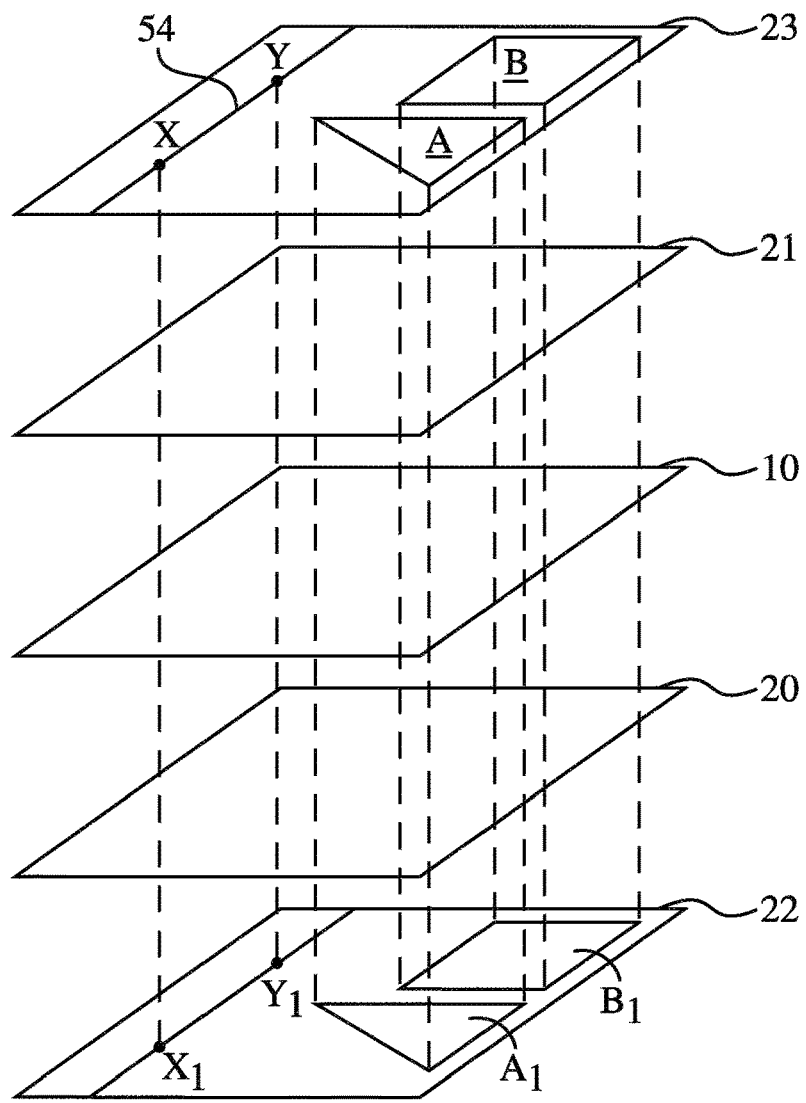
Figure 21:
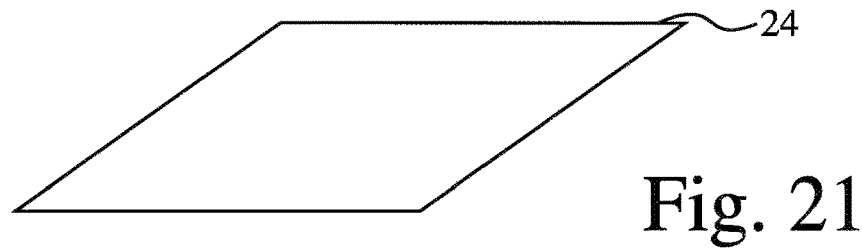

FIG. 21 illustrates the non-uniformity in the sheet resistance of first electrically conductive layer 22 of multi-layer electrochromic device 1. First electrically conductive layer 22 comprises a sheet resistance gradient curve (the line comprising line segment $X_1$-$Y_1$, indicating that the sheet resistance, $R_s$, within electrically conductive layer 22 progressively increases as described in connection with FIG. 2). Between $X_1$ and $Y_1$, the sheet resistance of first electrically conductive layer 22 generally increases, generally decreases or generally increases and then decreases. In one embodiment, line segment $X_1$-$Y_1$ has a length of at least 1 cm. For example, line segment $X_1$-$Y_1$ may have a length of 2.5 cm, 5 cm, 10 cm, or 25 cm. Additionally, line segment $X_1$-$Y_1$ may be straight or curved.

In one embodiment, the non-uniformity in the sheet resistance of the first electrically conductive layer may be observed by comparing the ratio of the average sheet resistance, $R_{avg}$ in two different regions of the first electrically conductive layer wherein the first and second regions are each circumscribed by a convex polygon and each comprises at least 25% of the surface area of the first electrically conductive layer. For example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.25 wherein each of the first and second regions is circumscribed by a convex polygon, and each comprises at least 25% of the surface area of the first electrically conductive layer. This may be illustrated by reference to FIG. 21. First electrically conductive layer 22 comprises convex polygon $A_1$ and convex polygon $B_1$ and each circumscribes a region comprising at least 25% of the surface area of first electrically conductive layer 22; in one embodiment, the ratio of the average sheet resistance, $R^1_{avg}$, in a first region of the first electrically conductive layer bounded by convex polygon $A_1$ to the average sheet resistance, $R^2_{avg}$, in a second region of the first electrically conductive layer bounded by convex polygon $B_1$ is at least 1.25. As illustrated, convex polygon $A_1$ is a triangle and convex polygon $B_1$ is a square merely for purposes of exemplification; in practice, the first region may be bounded by any convex polygon and the second region may be bounded by any convex polygon. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.5 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 2 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 3 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 4 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 5 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 6 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 7 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 8 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 9 wherein the first and second regions are each circumscribed by a convex polygon and each comprises at least 25% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 10 wherein the first and second regions are each circumscribed by a convex polygon and each comprises at least 25% of the surface area of the first electrically conductive layer. In one embodiment in each of the foregoing examples, the first and second regions are mutually exclusive regions.

In one embodiment, the non-uniformity in the sheet resistance of the first electrically conductive layer may be observed by comparing the average sheet resistance, $R_{avg}$ in four different regions of the first electrically conductive layer wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. For example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.25, the ratio of the average sheet resistance in the second region of the first electrically conductive layer, $R^2_{avg}$, to the average sheet resistance in a third region of the first electrically conductive layer, $R^3_{avg}$, is at least 1.25, the ratio of the average sheet resistance in the third region of the first electrically conductive layer, $R^3_{avg}$, to the average sheet resistance in a fourth region of the first electrically conductive layer, $R^4_{avg}$, is at least 1.25, wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.5, the ratio of the average sheet resistance in the second region of the first electrically conductive layer, $R^2_{avg}$, to the average sheet resistance in a third region of the first electrically conductive layer, $R^3_{avg}$, is at least 1.5, the ratio of the average sheet resistance in the third region of the first electrically conductive layer, $R^3_{avg}$, to the average sheet resistance in a fourth region of the first electrically conductive layer, $R^4_{avg}$, is at least 1.5, wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 2, the ratio of the average sheet resistance in the second region of the first electrically conductive layer, $R^2_{avg}$, to the average sheet resistance in a third region of the first electrically conductive layer, $R^3_{avg}$, is at least 2, the ratio of the average sheet resistance in the third region of the first electrically conductive layer, $R^3_{avg}$, to the average sheet resistance in a fourth region of the first electrically conductive layer, $R^4_{avg}$, is at least 2, wherein the first region is contiguous with the second region, the second region is contiguous with the third region, the third region is contiguous with the fourth region, each of the regions is circumscribed by a convex polygon, and each comprises at least 10% of the surface area of the first electrically conductive layer. In one embodiment in each of the foregoing examples, the first, second, third and fourth regions are mutually exclusive regions.

In one presently preferred embodiment, the second electrically conductive layer has a sheet resistance, $R_s$, to the flow of electrical current through the second electrically conductive layer that varies as a function of position in the second electrically conductive layer. In one such embodiment, the ratio of the value of maximum sheet resistance, $R_{max}$, to the value of minimum sheet resistance, $R_{min}$, in the second electrically conductive layer is at least about 1.25. In one exemplary embodiment, the ratio of the value of maximum sheet resistance, $R_{max}$, to the value of minimum sheet resistance, $R_{min}$, in the second electrically conductive layer is at least about 1.5. In one exemplary embodiment, the ratio of the value of maximum sheet resistance, $R_{max}$, to the value of minimum sheet resistance, $R_{min}$, in the second electrically conductive layer is at least about 2. In one exemplary embodiment, the ratio of the value of maximum sheet resistance, $R_{max}$, to the value of minimum sheet resistance, $R_{min}$, in the second electrically conductive layer is at least about 3. In one exemplary embodiment, the ratio of the value of maximum sheet resistance, $R_{max}$, to the value of minimum sheet resistance, $R_{min}$, in the second electrically conductive layer is at least about 4. In one exemplary embodiment, the ratio of the value of maximum sheet resistance, $R_{max}$, to the value of minimum sheet resistance, $R_{min}$, in the second electrically conductive layer is at least about 5. In one exemplary embodiment, the ratio of the value of maximum sheet resistance, $R_{max}$, to the value of minimum sheet resistance, $R_{min}$, in the second electrically conductive layer is at least about 6. In one exemplary embodiment, the ratio of the value of maximum sheet resistance, $R_{max}$, to the value of minimum sheet resistance, $R_{min}$, in the second electrically conductive layer is at least about 7. In one exemplary embodiment, the ratio of the value of maximum sheet resistance, $R_{max}$, to the value of minimum sheet resistance, $R_{min}$, in the second electrically conductive layer is at least about 8. In one exemplary embodiment, the ratio of the value of maximum sheet resistance, $R_{max}$, to the value of minimum sheet resistance, $R_{min}$, in the second electrically conductive layer is at least about 9. In one exemplary embodiment, the ratio of the value of maximum sheet resistance, $R_{max}$, to the value of minimum sheet resistance, $R_{min}$, in the second electrically conductive layer is at least about 10.

FIG. 21 illustrates the non-uniformity in the sheet resistance of second electrically conductive layer 23 of multi-layer electrochromic device 1. Electrically conductive layer 22 comprises sheet resistance gradient curve 54 which includes line segment X-Y; between X and Y, the sheet resistance of second electrically conductive layer 23 generally increases, generally decreases or generally increases and then decreases. In one embodiment, line segment $X_1$-$Y_1$ has a length of at least 1 cm. For example, line segment X-Y may have a length of 2.5 cm, 5 cm, 10 cm, or 25 cm. Additionally, line segment X-Y may be straight or curved.

In one embodiment, the non-uniformity in the sheet resistance of the second electrically conductive layer may be observed by comparing the ratio of the average sheet resistance, $R_{avg}$ in two different regions of the second electrically conductive layer wherein the first and second regions are each circumscribed by a convex polygon and each comprises at least 25% of the surface area of the second electrically conductive layer. For example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.25 wherein the first and second regions are each circumscribed by a convex polygon and each comprises at least 25% of the surface area of the second electrically conductive layer. This may be illustrated by reference to FIG. 21. Second electrically conductive layer 23 comprises convex polygon A and convex polygon B and each circumscribes a region comprising at least 25% of the surface area of second electrically conductive layer 23; in one embodiment, the ratio of the average sheet resistance, $R^1_{avg}$, in a first region of the second electrically conductive layer bounded by convex polygon A to the average sheet resistance, $R^2_{avg}$, in a second region of the second electrically conductive layer bounded by convex polygon B is at least 1.25. As illustrated, convex polygon A is a triangle and convex polygon B is a square merely for purposes of exemplification; in practice, the first region may be bounded by any convex polygon and the second region may be bounded by any convex polygon. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.5 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 2 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 3 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 4 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 5 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 6 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 7 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 8 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 9 wherein the first and second regions are each circumscribed by a convex polygon and each comprises at least 25% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 10 wherein the first and second regions are each circumscribed by a convex polygon and each comprises at least 25% of the surface area of the second electrically conductive layer. In one embodiment in each of the foregoing examples, the first and second regions are mutually exclusive regions.

In one embodiment, the non-uniformity in the sheet resistance of the second electrically conductive layer may be observed by comparing the average sheet resistance, $R_{avg}$ in four different regions of the second electrically conductive layer wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. For example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.25, the ratio of the average sheet resistance in the second region of the second electrically conductive layer, $R^2_{avg}$, to the average sheet resistance in a third region of the second electrically conductive layer, $R^3_{avg}$, is at least 1.25, the ratio of the average sheet resistance in the third region of the second electrically conductive layer, $R^3_{avg}$, to the average sheet resistance in a fourth region of the second electrically conductive layer, $R^4_{avg}$, is at least 1.25, wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 1.5, the ratio of the average sheet resistance in the second region of the second electrically conductive layer, $R^2_{avg}$, to the average sheet resistance in a third region of the second electrically conductive layer, $R^3_{avg}$, is at least 1.5, the ratio of the average sheet resistance in the third region of the second electrically conductive layer, $R^3_{avg}$, to the average sheet resistance in a fourth region of the second electrically conductive layer, $R^4_{avg}$, is at least 1.5, wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. By way of further example, in one such embodiment, the ratio of the average sheet resistance in a first region of the second electrically conductive layer, $R^1_{avg}$, to the average sheet resistance in a second region of the second electrically conductive layer, $R^2_{avg}$, is at least 2, the ratio of the average sheet resistance in the second region of the second electrically conductive layer, $R^2_{avg}$, to the average sheet resistance in a third region of the second electrically conductive layer, $R^3_{avg}$, is at least 2, the ratio of the average sheet resistance in the third region of the second electrically conductive layer, $R^3_{avg}$, to the average sheet resistance in a fourth region of the second electrically conductive layer, $R^4_{avg}$, is at least 2, wherein the first region is contiguous with the second region, the second region is contiguous with the third region, the third region is contiguous with the fourth region, each of the regions is circumscribed by a convex polygon, and each comprises at least 10% of the surface area of the second electrically conductive layer. In one embodiment in each of the foregoing examples, the first, second, third and fourth regions are mutually exclusive regions.

In one presently preferred embodiment, first and second electrically conductive layers 22, 23 have a sheet resistance, $R_s$, to the flow of electrical current through the second electrically conductive layer that varies as a function of position in the first and second electrically conductive layers. Although it is generally preferred in this embodiment that the ratio of the value of maximum sheet resistance, $R_{max}$, to the value of minimum sheet resistance, $R_{min}$, in the first and second electrically conductive layers be approximately the same, they may have different values. For example, in one such embodiment, the ratio of the value of maximum sheet resistance, $R_{max}$, to the value of minimum sheet resistance, $R_{min}$, in the first electrically conductive layer has a value that is at least twice as much as the ratio of the value of maximum sheet resistance, $R_{max}$, to the value of minimum sheet resistance, $R_{min}$, in the second electrically conductive layer. More typically, however, the ratio of the value of maximum sheet resistance, $R_{max}$, to the value of minimum sheet resistance, $R_{min}$, in the first and second electrically conductive layers will be approximately the same and each at least about 1.25. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in the first and second electrically conductive layers will be approximately the same and each at least about 1.5. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 2. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{max}$, in each of the first and second electrically conductive layers is at least about 3. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{max}$, in each of the first and second electrically conductive layers is at least about 4. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 5. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 6. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 7. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 8. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 9. In one exemplary embodiment, the ratio of the value of maximum sheet resistance, $R_{max}$, to the value of minimum sheet resistance, $R_{min}$, the ratio of the value of maximum sheet resistance, $R_{max}$, to the value of minimum sheet resistance, $R_{min}$, in each of the first and second electrically conductive layers is at least about 10.

In one embodiment, the non-uniformity in the sheet resistance of the first and second electrically conductive layers may be observed by comparing the ratio of the average sheet resistance, $R_{avg}$ in two different regions of the first and second electrically conductive layers, respectively, wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. For example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.25 and the ratio of the average sheet resistance in a first region of the second electrically conductive layer, $R^1_{avg}$, to the average sheet resistance in a second region of the second electrically conductive layer, $R^2_{avg}$, is at least 1.25 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 1.5 and the ratio of the average sheet resistance in a first region of the second electrically conductive layer, $R^1_{avg}$, to the average sheet resistance in a second region of the second electrically conductive layer, $R^2_{avg}$, is at least 1.5 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 2 and the ratio of the average sheet resistance in a first region of the second electrically conductive layer, $R^1_{avg}$, to the average sheet resistance in a second region of the second electrically conductive layer, $R^2_{avg}$, is at least 2 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 3 and the ratio of the average sheet resistance in a first region of the second electrically conductive layer, $R^1_{avg}$, to the average sheet resistance in a second region of the second electrically conductive layer, $R^2_{avg}$, is at least 3 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 4 and the ratio of the average sheet resistance in a first region of the second electrically conductive layer, $R^1_{avg}$, to the average sheet resistance in a second region of the second electrically conductive layer, $R^2_{avg}$, is at least 4 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 5 and the ratio of the average sheet resistance in a first region of the second electrically conductive layer, $R^1_{avg}$, to the average sheet resistance in a second region of the second electrically conductive layer, $R^2_{avg}$, is at least 5 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 6 and the ratio of the average sheet resistance in a first region of the second electrically conductive layer, $R^1_{avg}$, to the average sheet resistance in a second region of the second electrically conductive layer, $R^2_{avg}$, is at least 6 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 7 and the ratio of the average sheet resistance in a first region of the second electrically conductive layer, $R^1_{avg}$, to the average sheet resistance in a second region of the second electrically conductive layer, $R^2_{avg}$, is at least 7 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 8 and the ratio of the average sheet resistance in a first region of the second electrically conductive layer, $R^1_{avg}$, to the average sheet resistance in a second region of the second electrically conductive layer, $R^2_{avg}$, is at least 8 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 9 and the ratio of the average sheet resistance in a first region of the second electrically conductive layer, $R^1_{avg}$, to the average sheet resistance in a second region of the second electrically conductive layer, $R^2_{avg}$, is at least 9 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. By way of further example, in one such embodiment, the ratio of the average sheet resistance in a first region of the first electrically conductive layer, $R^1_{avg}$, to the average sheet resistance in a second region of the first electrically conductive layer, $R^2_{avg}$, is at least 10 and the ratio of the average sheet resistance in a first region of the second electrically conductive layer, $R^1_{avg}$, to the average sheet resistance in a second region of the second electrically conductive layer, $R^2_{avg}$, is at least 10 wherein the first and second regions of the first electrically conductive layer are each circumscribed by a convex polygon and each comprises at least 25% of the surface area of the first electrically conductive layer and the first and second regions of the second electrically conductive layer are each circumscribed by a convex polygon and each comprises at least 25% of the surface area of the second electrically conductive layer. In one embodiment in each of the foregoing examples, the first and second regions are mutually exclusive regions.

Referring again to FIG. 21, the spatial non-uniformity of the sheet resistance of the first and second electrically conductive layer may be correlated in accordance with one aspect of the present invention. For example, line segment $X_1$-$Y_1$ in first electrically conductive layer 22 may be projected through second electrode layer 21, ion conductor layer 10 and first electrode layer 20 and onto second electrically conductive layer 23, with the projection defining line segment X-Y. In general, if the sheet resistance generally increases in first electrically conductive layer 22 along line segment $X_1$-$Y_1$ (i.e., the sheet resistance generally increases moving along the sheet resistance gradient curve in the direction from point $X_1$ to point $Y_1$), the sheet resistance generally decreases in second electrically conductive layer 23 along segment X-Y (i.e., the sheet resistance generally decreases along sheet resistance gradient curve 54 and in the direction from point X to point Y). As previously noted, line segments X-Y and $X_1$-$Y_1$ have a length of at least 1 cm. For example, line segments X-Y and $X_1$-$Y_1$ may have a length of 2.5 cm, 5 cm, 10 cm, or 25 cm. Additionally, line segments X-Y and $X_1$-$Y_1$ may be straight or curved. In one embodiment, for example, the sheet resistance gradients in electrically conductive layers 22, 23 are non-zero constants and are of opposite sign (e.g., the sheet resistance generally increases linearly in first electrically conductive layer along in the direction from point $X_1$ to point $Y_1$ and generally decreases linearly along sheet resistance gradient curve 54 in the direction from point X to point Y). By way of further example, in one embodiment, substrates 24, 25 are rectangular and the sheet resistance gradients in electrically conductive layers 22, 23 are non-zero constants and are of opposite sign (e.g., the sheet resistance generally increases linearly in second electrically conductive layer 23 along gradient 54 in the direction from point X to point Y and generally decreases linearly in first electrically conductive layer 22 along the line containing line segment $X_1$-$Y_1$ in the direction from point $X_1$ to point $Y_1$).

In another embodiment, and still referring to FIG. 21, the spatial non-uniformity of the sheet resistance of the first and second electrically conductive layers may be characterized by reference to separate first and second regions in the first electrically conductive layer and their projections onto the second electrically conductive layer to define complementary first and second regions in the second electrically conductive layer wherein the first and second regions of the first electrically conductive layer are each bounded by a convex polygon, each contain at least 25% of the surface area of the first electrically conductive layer, and are mutually exclusive regions. In general, the first electrically conductive layer has an average sheet resistance in the first and regions of the first electrically conductive layer and the second electrically conductive layer has an average sheet resistance in the complementary first and second regions of the second electrically conductive layer wherein: (a) (i) a ratio of the average sheet resistance of the first electrically conductive layer in the first region to the average sheet resistance of the first electrically conductive layer in the second region is at least 1.5 or (ii) a ratio of the average sheet resistance of the second electrically conductive layer in the complementary first region to the average sheet resistance of the second electrically conductive layer in the complementary second region is greater than 1.5 and (b) a ratio of the average sheet resistance of the first electrically conductive layer in the first region to the average sheet resistance of the second electrically layer in the complementary first region (i.e., the projection of the first region of the first electrically conductive layer onto the second electrically conductive layer) is at least 150% of the ratio of the average sheet resistance of the first electrically conductive layer in the second region to the average sheet resistance of the second electrically layer in the complementary second region (i.e., the projection of the second region of the first electrically conductive layer onto the second electrically conductive layer).

Referring again to FIG. 21, first electrically conductive layer 22 comprises a region $A_1$ and a region $B_1$ wherein region $A_1$ and region $B_1$ each comprise at least 25% of the surface area of the first electrically conductive layer, are each circumscribed by a convex polygon and are mutually exclusive regions. A projection of region $A_1$ onto second electrically conductive layer 23 defines a region A circumscribed by a convex polygon in the second electrically conductive layer comprising at least 25% of the surface area of the second electrically conductive layer. A projection of region $B_1$ onto the second electrically conductive layer defines a region B circumscribed by a convex polygon in the second electrically conductive layer comprising at least 25% of the surface area of the second electrically conductive layer. First electrically conductive layer 22 has an average sheet resistance in region $A_1$ corresponding to $R^{A1}_{avg}$ and an average sheet resistance in region $B_1$ corresponding to $R^{B1}_{avg}$. Second electrically conductive layer 23 has an average sheet resistance in region A corresponding to $R^A_{avg}$ and an average sheet resistance in region B corresponding to $R^B_{avg}$. In accordance with one embodiment, (i) the ratio of $R^{A1}_{avg}$ to $R^{B1}_{avg}$ or the ratio of $R^B_{avg}$ to $R^A_{avg}$ is at least 1.5 and (ii) the ratio of $(R^{A1}_{avg}/R^A_{avg})$ to $(R^{B1}_{avg}/R^B_{avg})$ is at least 1.5. For example, in one embodiment, (i) the ratio of $R^{A1}_{avg}$ to $R^{B1}_{avg}$ or the ratio of $R^B_{avg}$ to $R^A_{avg}$ is at least 1.75 and (ii) the ratio of $(R^{A1}_{avg}/R^A_{avg})$ to $(R^{B1}_{avg}/R^B_{avg})$ is at least 1.75. By way of further example, in one embodiment, (i) the ratio of $R^{A1}_{avg}$ to $R^{B1}_{avg}$ or the ratio of $R^B_{avg}$ to $R^A_{avg}$ is at least 2 and (ii) the ratio of $(R^{A1}_{avg}/R^A_{avg})$ to $(R^{B1}_{avg}/R^B_{avg})$ is at least 2. By way of further example, in one embodiment, (i) the ratio of $R^{A1}_{avg}$ to $R^{B1}_{avg}$ or the ratio of $R^B_{avg}$ to $R^A_{avg}$ is at least 3 and (ii) the ratio of $(R^{A1}_{avg}/R^A_{avg})$ to $(R^{B1}_{avg}/R^B_{avg})$ is at least 3. By way of further example, in one embodiment, (i) the ratio of $R^{A1}_{avg}$ to $R^{B1}_{avg}$ or the ratio of $R^B_{avg}$ to $R^A_{avg}$ is at least 5 and (ii) the ratio of $(R^{A1}_{avg}/R^A_{avg})$ to $(R^{B1}_{avg}/R^B_{avg})$ is at least 5. By way of further example, in one embodiment, (i) the ratio of $R^{A1}_{avg}$ to $R^{B1}_{avg}$ or the ratio of $R^B_{avg}$ to $R^A_{avg}$ is at least 10 and (ii) the ratio of $(R^{A1}_{avg}/R^A_{avg})$ to $(R^{B1}_{avg}/R^B_{avg})$ is at least 10.

Without wishing to be bound by any particular theory, and based upon certain experimental evidence obtained to-date, in certain embodiments the electrode sheet resistance may be expressed as a function of position in a large area electrochromic device that provides a local voltage drop across the electrochromic stack that is substantially constant. For the simple geometry shown in FIG. 1, where the contact (bus bar 27) to the top electrode is made at x=0 and the contact (bus bar 26) to the bottom electrode is made at x=xt, the relationship is simply that $$R'(x)=R(x)*(xt/x-1);$$

where R(x) is the sheet resistance of the top electrode as a function of position and R'(x) is the sheet resistance of the bottom electrode as a function of position. A simple mathematical example of this relationship is that for a linear change in the sheet resistance of the top electrode, R(x)=a*x, the sheet resistance of the bottom electrode must be R'(x)=a*(xt−x). Another simple example is that for R(x)=1/[a*(xt−x)] then R'(x)=1/(a*x). This relationship holds in a mathematical sense for any function R(x). This relationship can be generalized to any electrode sheet resistance distribution that smoothly varies and any contact configuration by the following relationship between the sheet resistance from one contact (z=0) to anther (z=L) along gradient curves that are perpendicular to iso-resistance lines R(z), and the corresponding opposing electrode sheet resistance distribution R'(z).

$$R'(z)=R(z)*(L/z-1);$$

As a practical matter, devices do not need to precisely adhere to this relationship to realize the benefits of this invention. For example, in the case above where R'(x)=1/(a*x), R'(0)=infinity. While one can practically create resistances of very large magnitude, a film with a R'(x)=1/(a*x+b) where b is small relative to a can exhibit significantly improved switching uniformity over a device comprising electrodes of uniform sheet resistance.

Figure 3:
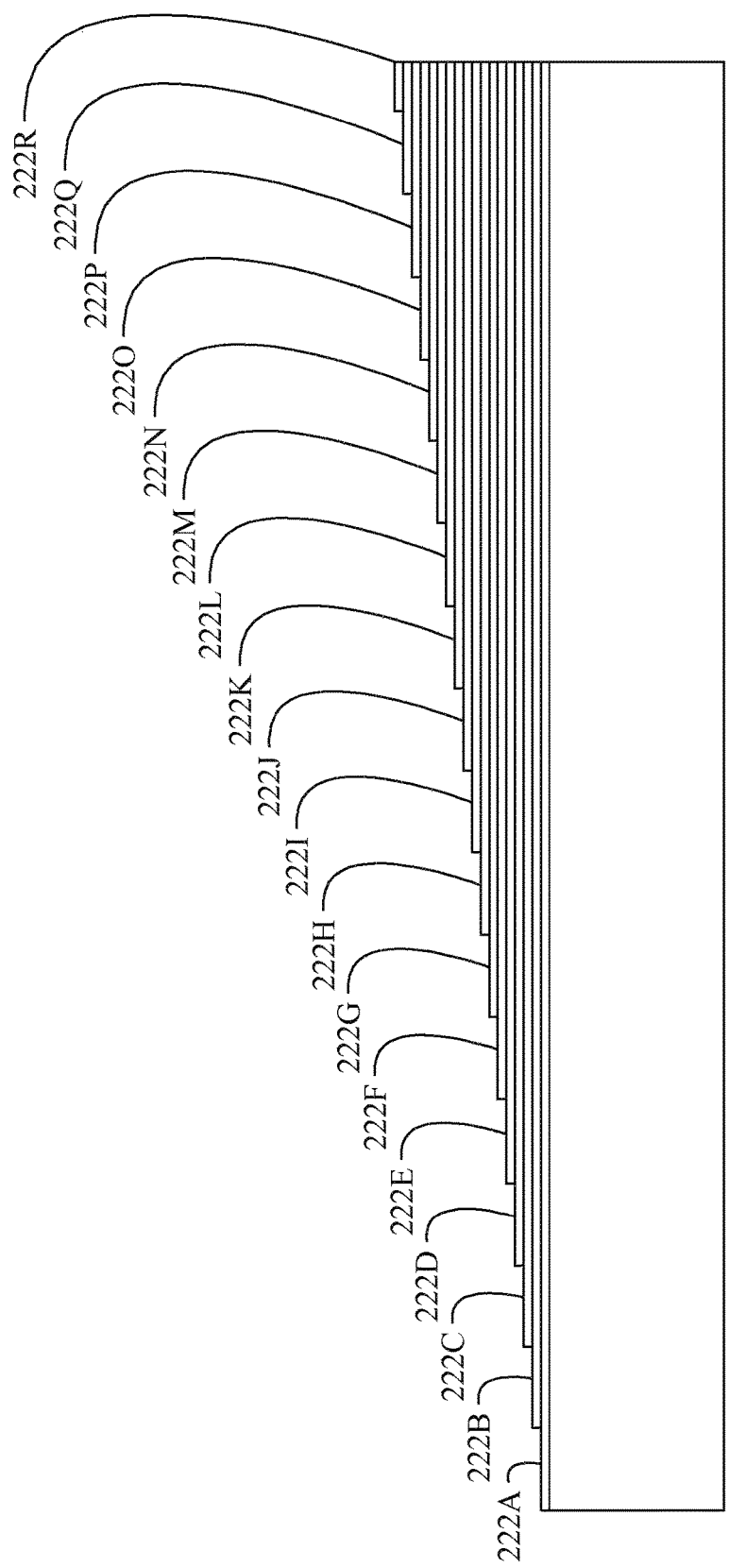
FIG. 3 is a schematic cross-section of an electrically conductive layer having a graded thickness on a substrate.

Electrically conductive layers having a non-uniform sheet resistance may be prepared by a range of methods. In one embodiment, the non-uniform sheet resistance is the result of a composition variation in the layer; composition variations may be formed, for example, by sputter coating from two cylindrical targets of different materials while varying the power to each target as a function of position relative to the substrate, by reactive sputter coating from a cylindrical target while varying the gas partial pressure and/or composition as a function of position relative to the substrate, by spray coating with a varying composition or process as a function of position relative to the substrate, or by introducing a dopant variation to a uniform composition and thickness film by ion implantation, diffusion, or reaction. In another embodiment, the non-uniform sheet resistance is the result of a thickness variation in the layer; thickness variations may be formed, for example, by sputter coating from a cylindrical target while varying the power to the target as a function of as a function of position relative to the substrate, sputter coating from a target at constant power and varying the velocity of substrate under the target as a function of as a function of position relative to the substrate, a deposited stack of uniform TCO films 222a-222r on substrate 224 where each film has a limited spatial extent as illustrated in FIG. 3. Alternatively, a thickness gradient can be formed by starting with a uniform thickness conductive layer and then etching the layer in a way that is spatially non-uniform such as dip-etching or spraying with etchant at a non-uniform rate across the layer. In another embodiment, the non-uniform sheet resistance is the result of patterning; gradients may be introduced, for example, by laser patterning a series of scribes into a constant thickness and constant resistivity film to create a desired spatially varying resistivity. In addition to laser patterning, mechanical scribing and lithographic patterning using photoresists (as known in the art of semiconductor device manufacturing) can be used to create a desired spatially varying resistivity. In another embodiment, the non-uniform sheet resistance is the result of a defect variation; a defect variation may be introduced, for example, by introducing spatially varying defects via ion implantation, or creating a spatially varying defect density via a spatially varying annealing process applied to a layer with a previously uniform defect density.

Referring again to FIG. 1, at least one of first and second electrode layers 20 and 21 is electrochromic, one of the first and second electrode layers is the counter electrode for the other, and first and second electrode layers 20 and 21 are inorganic and/or solid. Non-exclusive examples of electrochromic electrode layers 20 and 21 are cathodically coloring thin films of oxides based on tungsten, molybdenum, niobium, titanium, lead and/or bismuth, or anodically coloring thin films of oxides, hydroxides and/or oxy-hydrides based on nickel, iridium, iron, chromium, cobalt and/or rhodium.

In one embodiment, first electrode layer 20 contains any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_3$), nickel oxide ($Ni_2O_3$), cobalt oxide ($Co_2O_3$) and the like. In some embodiments, the metal oxide is doped with one or more dopants such as lithium, sodium, potassium, molybdenum, vanadium, titanium, and/or other suitable metals or compounds containing metals. Mixed oxides (e.g., W—Mo oxide, W—V oxide) are also used in certain embodiments.

In some embodiments, tungsten oxide or doped tungsten oxide is used for first electrode layer 20. In one embodiment, first electrode layer 20 is electrochromic and is made substantially of $WO_x$, where "x" refers to an atomic ratio of oxygen to tungsten in the electrochromic layer, and x is between about 2.7 and 3.5. It has been suggested that only sub-stoichiometric tungsten oxide exhibits electrochromism; i.e., stoichiometric tungsten oxide, $WO_3$, does not exhibit electrochromism. In a more specific embodiment, $WO_x$, where x is less than 3.0 and at least about 2.7 is used for first electrode layer 20. In another embodiment, first electrode layer 20 is $WO_x$, where x is between about 2.7 and about 2.9. Techniques such as Rutherford Backscattering Spectroscopy (RBS) can identify the total number of oxygen atoms which include those bonded to tungsten and those not bonded to tungsten. In some instances, tungsten oxide layers where x is 3 or greater exhibit electrochromism, presumably due to unbound excess oxygen along with sub-stoichiometric tungsten oxide. In another embodiment, the tungsten oxide layer has stoichiometric or greater oxygen, where x is 3.0 to about 3.5.

In certain embodiments, the electrochromic mixed metal oxide is crystalline, nanocrystalline, or amorphous. In some embodiments, the tungsten oxide is substantially nanocrystalline, with grain sizes, on average, from about 5 nm to 50 nm (or from about 5 nm to 20 nm), as characterized by transmission electron microscopy (TEM). The tungsten oxide morphology may also be characterized as nanocrystalline using x-ray diffraction (XRD); XRD. For example, nanocrystalline electrochromic tungsten oxide may be characterized by the following XRD features: a crystal size of about 10 to 100 nm (e.g., about 55 nm). Further, nanocrystalline tungsten oxide may exhibit limited long range order, e.g., on the order of several (about 5 to 20) tungsten oxide unit cells.

The thickness of the first electrode layer 20 depends on the electrochromic material selected for the electrochromic layer. In some embodiments, first electrode layer 20 is about 50 nm to 2,000 nm, or about 100 nm to 700 nm. In some embodiments, the first electrode layer 20 is about 250 nm to about 500 nm.

Second electrode layer 21 serves as the counter electrode to first electrode layer 20 and, like first electrode layer 20, second electrode layer 21 may comprise electrochromic materials as well as non-electrochromic materials. Non-exclusive examples of second electrode layer 21 are cathodically coloring electrochromic thin films of oxides based on tungsten, molybdenum, niobium, titanium, lead and/or bismuth, anodically coloring electrochromic thin films of oxides, hydroxides and/or oxy-hydrides based on nickel, iridium, iron, chromium, cobalt and/or rhodium, or non-electrochromic thin films, e.g., of oxides based on vanadium and/or cerium as well as activated carbon. Also combinations of such materials can be used as second electrode layer 21.

In some embodiments, second electrode layer 21 may comprise one or more of a number of different materials that are capable of serving as reservoirs of ions when the electrochromic device is in the bleached state. During an electrochromic transition initiated by, e.g., application of an appropriate electric potential, the counter electrode layer transfers some or all of the ions it holds to the electrochromic first electrode layer 20, changing the electrochromic first electrode layer 20 to the colored state.

In some embodiments, suitable materials for a counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. Optically passive counter electrodes comprise cerium titanium oxide ($CeO_2$—$TiO_2$), cerium zirconium oxide ($CeO_2$—$ZrO_2$), nickel oxide (NiO), nickel-tungsten oxide (NiWO), vanadium oxide ($V_2O_5$), and mixtures of oxides (e.g., a mixture of $Ni_2O_3$ and $WO_3$). Doped formulations of these oxides may also be used, with dopants including, e.g., tantalum and tungsten. Because first electrode layer 20 contains the ions used to produce the electrochromic phenomenon in the electrochromic material when the electrochromic material is in the bleached state, the counter electrode preferably has high transmittance and a neutral color when it holds significant quantities of these ions.

In some embodiments, nickel-tungsten oxide (NiWO) is used in the counter electrode layer. In certain embodiments, the amount of nickel present in the nickel-tungsten oxide can be up to about 90% by weight of the nickel-tungsten oxide. In a specific embodiment, the mass ratio of nickel to tungsten in the nickel-tungsten oxide is between about 4:6 and 6:4 (e.g., about 1:1). In one embodiment, the NiWO is between about 15% (atomic) Ni and about 60% Ni; between about 10% W and about 40% W; and between about 30% O and about 75% O. In another embodiment, the NiWO is between about 30% (atomic) Ni and about 45% Ni; between about 10% W and about 25% W; and between about 35% O and about 50% O. In one embodiment, the NiWO is about 42% (atomic) Ni, about 14% W, and about 44% O.

In some embodiments, the thickness of second electrode layer 21 is about 50 nm about 650 nm. In some embodiments, the thickness of second electrode layer 21 is about 100 nm to about 400 nm, preferably in the range of about 200 nm to 300 nm.

Ion conducting layer 10 serves as a medium through which ions are transported (in the manner of an electrolyte) when the electrochromic device transforms between the bleached state and the colored state. Ion conductor layer 10 comprises an ion conductor material. It may be transparent or non-transparent, colored or non-colored, depending on the application. Preferably, ion conducting layer 10 is highly conductive to the relevant ions for the first and second electrode layers 20 and 21. Depending on the choice of materials, such ions include lithium ions ($Li^+$) and hydrogen ions ($H^+$) (i.e., protons). Other ions may also be employed in certain embodiments. These include deuterium ions ($D^+$), sodium ions ($Na^+$), potassium ions ($K^+$), calcium ions ($Ca^{++}$), barium ions ($Ba^{++}$), strontium ions ($Sr^{++}$), and magnesium ions ($Mg^{++}$). Preferably, ion conducting layer 10 also has sufficiently low electron conductivity that negligible electron transfer takes place during normal operation. In various embodiments, the ion conductor material has an ionic conductivity of between about $10^{-5}$ S/cm and $10^{-3}$ S/cm.

Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI (lithium bis(trifluoromethane) sulfonimide), $LiBF_4$ (lithium tetrafluoroborate), $LiAsF_6$ (lithium hexafluoro arsenate), $LiCF_3SO_3$ (lithium trifluoromethane sulfonate), and $LiClO_4$ (lithium perchlorate). Additional examples of suitable ion conducting layers include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conducting layer comprises a silicate-based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conducting layer 10 will vary depending on the material. In some embodiments using an inorganic ion conductor the ion conducting layer 10 is about 250 nm to 1 nm thick, preferably about 50 nm to 5 nm thick. In some embodiments using an organic ion conductor, the ion conducting layer is about 100000 nm to 1000 nm thick or about 25000 nm to 10000 nm thick. The thickness of the ion conducting layer is also substantially uniform. In one embodiment, a substantially uniform ion conducting layer varies by not more than about +/−10% in each of the aforementioned thickness ranges. In another embodiment, a substantially uniform ion conducting layer varies by not more than about +/−5% in each of the aforementioned thickness ranges. In another embodiment, a substantially uniform ion conducting layer varies by not more than about +/−3% in each of the aforementioned thickness ranges.

Referring again to FIG. 1, substrates 24 and 25 have flat surfaces. That is, they have a surface coincides with the tangential plane in each point. Although substrates with flat surfaces are typically employed for electrochromic architectural windows and many other electrochromic devices, it is contemplated that the multi-layer devices of the present invention may have a single or even a doubly curved surface. Stated differently, it is contemplated that each of the layers of stack 28 have a corresponding radius of curvature. See, for example, U.S. Pat. No. 7,808,692 which is incorporated herein by reference in its entirety with respect to the definition of single and doubly curved surfaces and methods for the preparation thereof.

Figure 4:
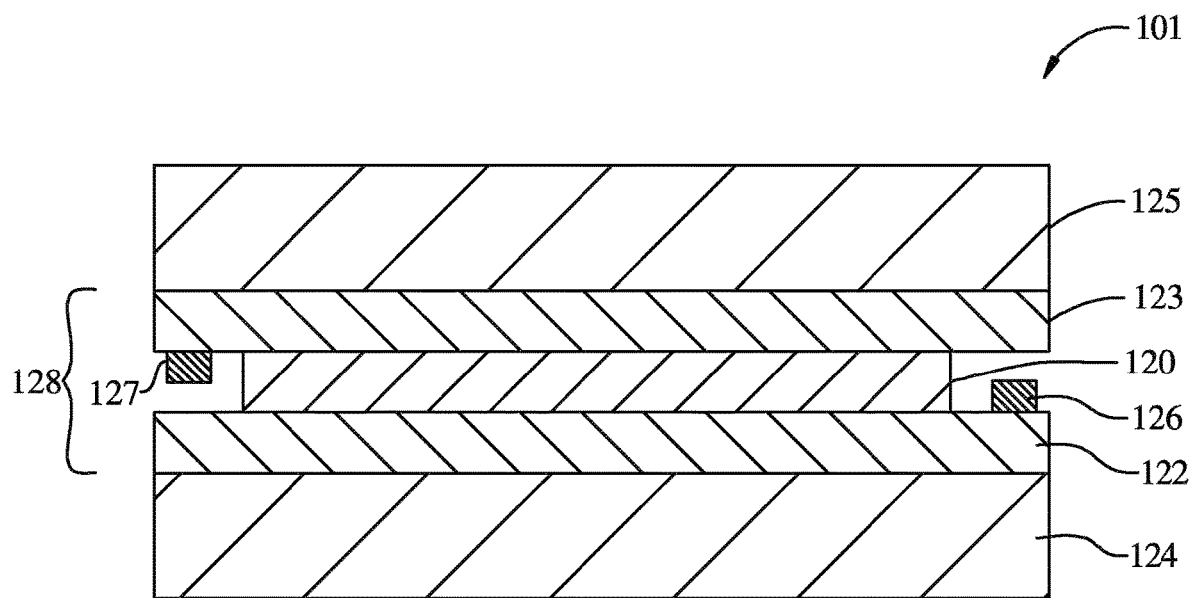
FIG. 4 is a schematic cross-section of an alternative embodiment of a multi-layer electrochromic device of the present invention.

FIG. 4 depicts a cross-sectional structural diagram of an electrochromic device according to a second embodiment of the present invention. Moving outward from the center, electrochromic device 101 comprises electrochromic electrode layer 120. On either side of electrochromic electrode layer 120 are first and second electrically conductive layers 122, 123 which, in turn, are arranged against outer substrates 124, 125. Elements 122, 120, and 123 are collectively referred to as an electrochromic stack 128. Electrically conductive layer 122 is in electrical contact with a voltage source via bus bar 126 and electrically conductive layer 123 is in electrical contact with a voltage source via bus bar 127 whereby the transmittance of electrochromic device 120 may be changed by applying a voltage pulse to electrically conductive layers 122, 123. The pulse causes a cathodic compound in electrochromic electrode layer 120 to undergo a reversible chemical reduction and an anodic compound in electrochromic electrode layer 120 to undergo a reversible chemical oxidation. Either the cathodic or anodic compound will demonstrate electrochromic behavior such that electrochromic electrode layer 120 becomes less transmissive or more transmissive after the pulse; in one embodiment, electrochromic device 101 has relatively greater transmittance before the voltage pulse and lesser transmittance after the voltage pulse or vice versa.

Figure 20:
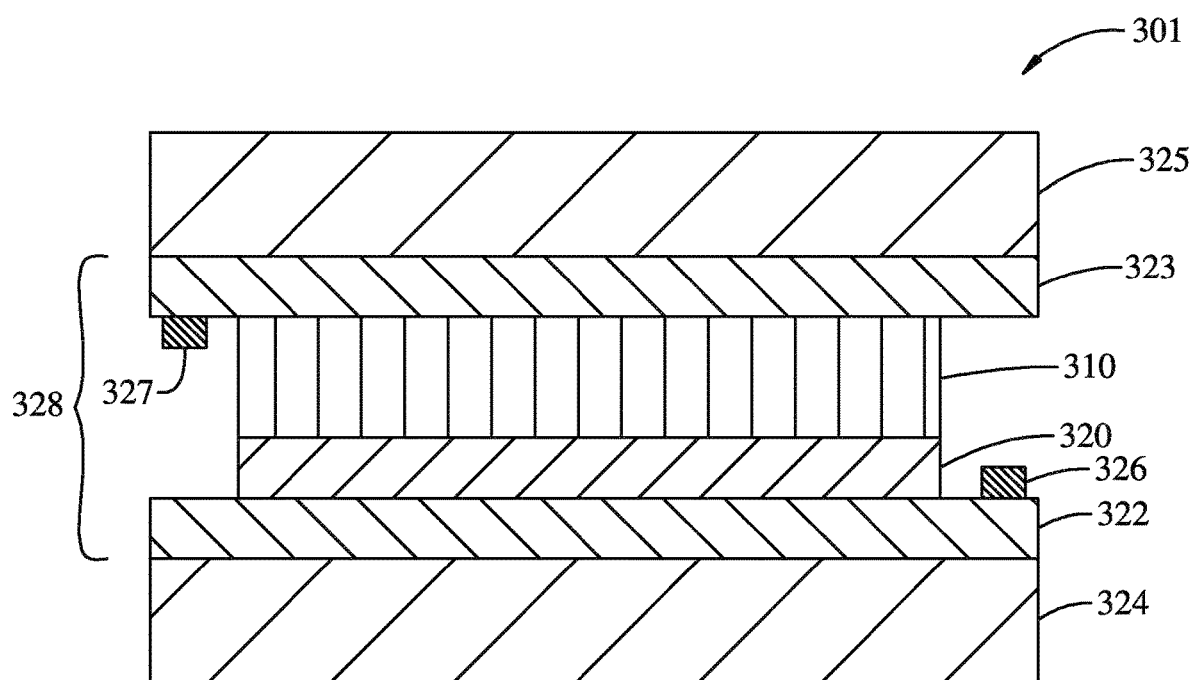
FIG. 20 is a schematic cross-section of an alternative embodiment of a multi-layer electrochromic device of the present invention.

FIG. 20 depicts a cross-sectional structural diagram of an electrochromic device according to a third embodiment of the present invention. Moving outward from the center, electrochromic device 301 comprises ion conductor layer 310. Electrochromic electrode layer 320 is on one side of and in contact with a first surface of ion conductor layer 310. A first electrically conductive layer 322 is in contact with electrochromic layer 320. A second electrically conductive layer 323 is on a second surface of ion conductor layer 310, the first and second surfaces of ion conductor layer 310 being opposing surfaces. The first and second electrically conductive layers 322, 323 are arranged against outer substrates 324, 325. Elements 310, 320, 322 and 323 are collectively referred to as electrochromic stack 328. Electrically conductive layer 322 is in electrical contact with a voltage source (not shown) via bus bar 326 and electrically conductive layer 323 is in electrical contact with a voltage source (not shown) via bus bar 327 whereby the transmittance of electrochromic layer 320 may be changed by applying a voltage pulse to electrically conductive layers 322, 323. Ion conductor layer 310 comprises a species that is capable of reversibly oxidizing or reducing upon the insertion or withdrawal of electrons or ions and this species may also be electrochromically active. The voltage pulse causes electrons and ions to move between first electrode layer 320 and ion conducting layer 310 and, as a result, electrochromic materials in the electrode layer 320 changes color, thereby making electrochromic device 301 less transmissive or more transmissive. In one embodiment, electrochromic device 301 has relatively greater transmittance before the voltage pulse and relatively lesser transmittance after the voltage pulse or vice versa.

In general, the composition and sheet resistance profiles for first and second electrically conductive layers 122, 123, 322, 323 are as previously described in connection with FIG. 1. Electrochromic electrode layers 120 and 320 may, for example, contain an electrochromic material, either as a solid film or dispersed in an electrolyte, the electrochromic material being selected from among inorganic metal oxides such as tungsten trioxide ($WO_3$), nickel oxide (NiO) and titanium dioxide ($TiO_2$), and organic electrochromic materials including bipyridinium salt (viologen) derivatives, N,N'-di(p-cyanophenyl) 4,4'-bipyridilium (CPQ), quinone derivatives such as anthraquinone and azine derivatives such as phenothiazine.

In operation, to switch an electrochromic device of the present invention from a first to a second optical state having differing transmissivities, i.e., from a state of relatively greater transmissivity to a state of lesser transmissivity or vice versa, a voltage pulse is applied to the electrical contacts/bus bars on the device. Once switched, the second optical state will persist for some time after the voltage pulse has ended and even in the absence of any applied voltage; for example, the second optical state will persist for at least 1 second after the voltage pulse has ended and even in the absence of any applied voltage. By way of further example, the second optical state may persist for at least 5 seconds after the voltage pulse has ended and even in the absence of any applied voltage. By way of further example, the second optical state may persist for at least 1 minute after the voltage pulse has ended and even in the absence of any applied voltage. By way of further example, the second optical state may persist for at least 1 hour after the voltage pulse has ended and even in the absence of any applied voltage. The device may then be returned from the second optical state to the first optical state by reversing the polarity and applying a second voltage pulse and, upon being switched back, the first optical state will persist for some time after the second pulse has ended even in the absence of any applied voltage; for example, the first optical state will persist for at least 1 second after the voltage pulse has ended and even in the absence of any applied voltage. By way of further example, the first optical state may persist for at least 1 minute after the voltage pulse has ended and even in the absence of any applied voltage. By way of further example, the first optical state may persist for at least 1 hour after the voltage pulse has ended and even in the absence of any applied voltage. This process of reversibly switching from a first persistent to a second persistent optical state, and then back again, can be repeated many times and practically indefinitely.

In some embodiments the waveform of the voltage pulse may be designed so that the local voltage across the electrochromic stack never exceeds a pre-determined level; this may be preferred, for example, in certain electrochromic devices where excessive voltage across the electrochromic stack can damage the device and/or induce undesirable changes to the electrochromic materials.

Advantageously, the non-uniform sheet resistance of the first and/or second electrically conductive layers of the multi-layer devices of the present invention may permit greater tolerances with respect to the magnitude and/or duration of the voltage pulse. As a result, the local voltage across the electrochromic stack may be significantly less than the voltage applied across the entire device because of the voltage drop in the electrically conductive layer(s). For example, in one embodiment, the applied potential across the electrochromic stack has a magnitude of at least 2 Volts. By way of further example, the voltage pulse may have a magnitude of at least 3 Volts. By way of further example, the voltage pulse may have a magnitude of at least 4 Volts. By way of further example, the voltage pulse may have a magnitude of at least 5 Volts. By way of further example, the voltage pulse may have a magnitude of at least 6 Volts. By way of further example, the voltage pulse may have a magnitude of at least 7 Volts. By way of further example, the voltage pulse may have a magnitude of at least 8 Volts. By way of further example, the voltage pulse may have a magnitude of at least 9 Volts. By way of further example, the voltage pulse may have a magnitude of at least 10 Volts. By way of further example, the voltage pulse may have a magnitude of at least 11 Volts. By way of further example, the voltage pulse may have a magnitude of at least 12 Volts. By way of further example, the voltage pulse may have a magnitude of at least 13 Volts. By way of further example, the voltage pulse may have a magnitude of at least 14 Volts. By way of further example, the voltage pulse may have a magnitude of at least 15 Volts. By way of further example, the voltage pulse may have a magnitude of at least 16 Volts. By way of further example, the voltage pulse may have a magnitude of at least 18 Volts. By way of further example, the voltage pulse may have a magnitude of at least 20 Volts. By way of further example, the voltage pulse may have a magnitude of at least 22 Volts. By way of further example, the voltage pulse may have a magnitude of at least 24 Volts. In general, such potentials may be applied for a relatively long period of time. For example, a potential having a magnitude of any of such values may be applied for a period of at least 1 seconds. By way of further example, a potential having a magnitude of any of such values may be applied for a period of at least 10 seconds. By way of further example, a potential having a magnitude of any of such values may be applied for a period of at least 20 seconds. By way of further example, a potential having a magnitude of any of such values may be applied for a period of at least 40 seconds.

To illustrate for one specific exemplary embodiment, a voltage pulse of 16 volts may be applied across an electrochromic stack incorporating two TCO electrically conductive layers having non-uniform sheet resistance and a bus bar located at opposite perimeter edges of the entire device. The voltage pulse rises quick to allow the local voltage drop across the layers to quickly ramp to 1.0 volts and maintain that voltage until the device switching approaches completeness at which point the device layers begin to charge up and the current drops. Because of the gradient and sheet resistance in the electrically conductive layers the voltage drop across the device is constant across the device and in addition, there is a voltage drop across each of the electrically conductive layers of the device. The voltage drops through the non-uniform resistivity electrically conductive layers enables a voltage significantly larger than the maximum operating voltage of the device stack to be applied across the entire assembly and maintain a local voltage across the device stack below a desired value. As the device charging takes place, the applied voltage is dropped to keep the local voltage across the device layers at 1.0 volts. The voltage pulse will drop to a steady state value close to 1 volt if it is desired to keep a steady state 1.0 volts across the local device thickness or alternatively the voltage pulse will drop to zero volts if it is desired to keep no voltage across the local device thickness in steady state.

To change the optical state of a multilayer device to an intermediate state, a voltage pulse is applied to the electrical contacts/bus bars on the device. This shape of this voltage pulse would typically be device specific and depend on the intermediate state desired. The intermediate state can be defined in terms of a total charge moved, charge state of device, or an optical measurement of the device. By using non-uniform electron conductor layers to apply uniform local voltages across the device layers this provides a unique advantage for rapid large area intermediate state control using optical state feedback since a local optical measurement of the device state near the edge will be representative of the entire device at all times (no iris effect). Also by using non-uniform electron conductor layers to apply uniform local voltages across the device layers this provides a unique advantage for rapid large area intermediate state control using voltage feedback since the voltage state at the bus bars will be representative of the entire device rather than an average across a non-uniformly colored device (again no iris effect). In a specific example, a voltage pulse of 32 volts is applied across an electrochromic device incorporating two gradient TCO layers and a bus bar located at opposite perimeter edges of the entire device. The voltage pulse rises quick to allow the local voltage drop across the layers to quickly ramp to 1.0 volts and maintain that voltage until the device reaches a desired optical state measured with an appropriate optical sensor at which point the voltage pulse quickly ramps down to zero or to a desired steady state voltage.

Having described the invention in detail, it will be apparent that modifications and variations are possible without departing the scope of the invention defined in the appended claims. Furthermore, it should be appreciated that all examples in the present disclosure are provided as non-limiting examples.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1: Iris Effect Switching

Figure 5:
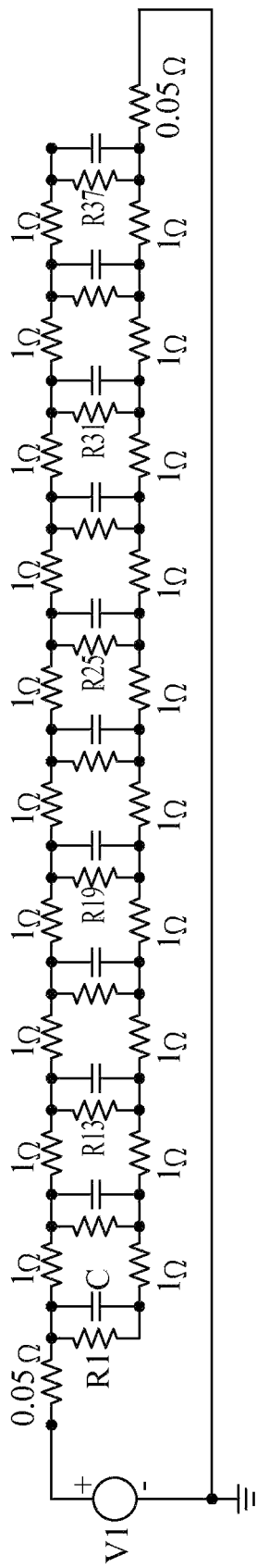
FIG. 5 is a 1-D lumped element circuit model diagram used to simulate dynamic behavior of an electrochromic device as described in Example 1.
Figure 6:
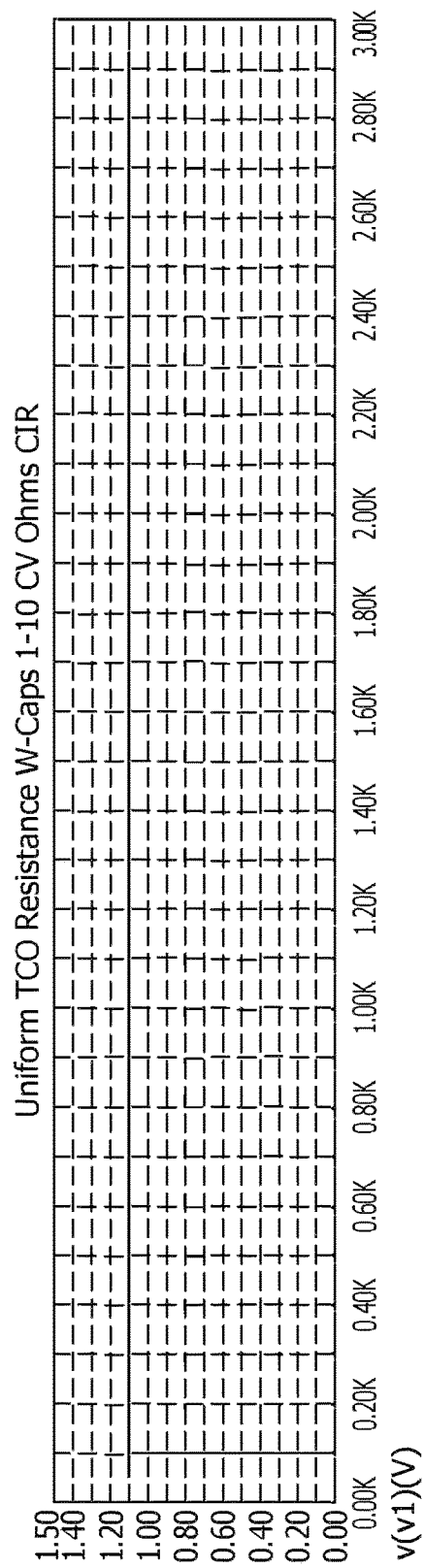
FIG. 6 is plot of the voltage waveform applied to the bus bars as described in Example 1.
Figure 7:
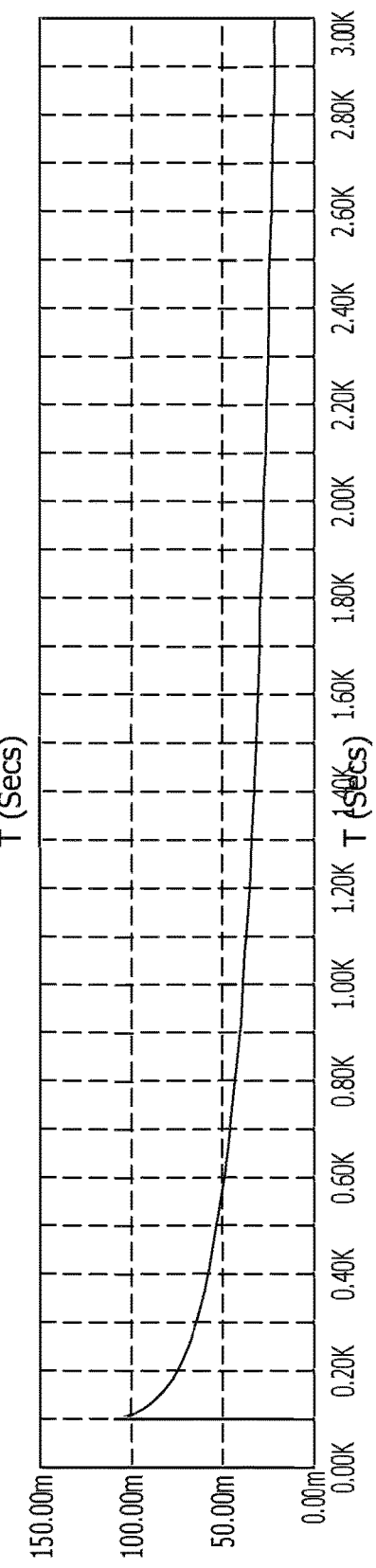
FIG. 7 is plot of current flowing into the device versus time as described in Example 1.
Figure 8:
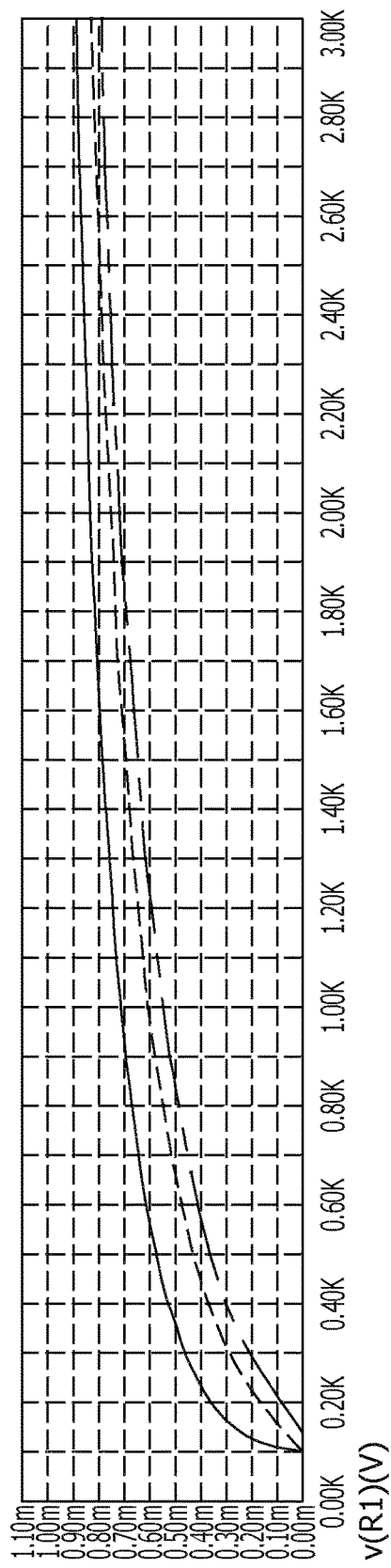
FIG. 8 is plot of the voltage across the electrochromic film at three locations (near the edge, near the center, and between these two) as described in Example 1.

A 1-D lumped element circuit model has been used to simulate the dynamic behavior of an electrochromic type device using component values appropriate to capture the switching dynamics of a large area device. The lumped element model shown in FIG. 5 is based on a paper by Skrayabin et. al. (Electrochimica Acta 44 (1999) 3203-3209). The electrochromic device is locally modeled by a parallel resistor and non-linear capacitor and the electrically conducting layer is locally modeled as a resistor. A network of these devices as shown in FIG. 5 models the behavior of a large area electrochromic device. A low resistance resistor between the device and the power supply simulates the contact resistance between the power supply and the device. FIG. 6 shows the applied voltage, a 1.1 volt step function. The resultant current flow is shown in FIG. 7; it rises rapidly to a maximum value and then decreases as the device switching takes place. FIG. 8 shows the voltage drop across the electrochromic device near the edge of the device, part way toward the center, and near the center of the device from both sides of the device (six traces total). What is seen is that the edge of the device switches relatively slowly and moving towards the center of the device the switching occurs even more slowly. The slower switching of the center of the device relative to the edge is the well understood characteristic of large area devices referred to as the iris effect.

Figure 9:
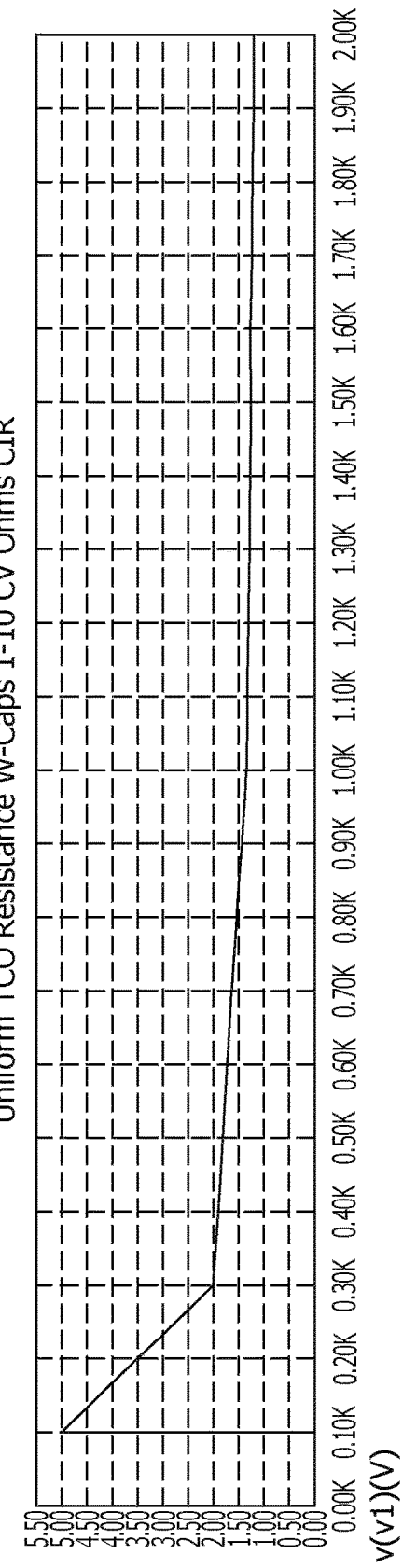
FIG. 9 is plot of the voltage waveform applied to the bus bars as described in Example 1.
Figure 10:
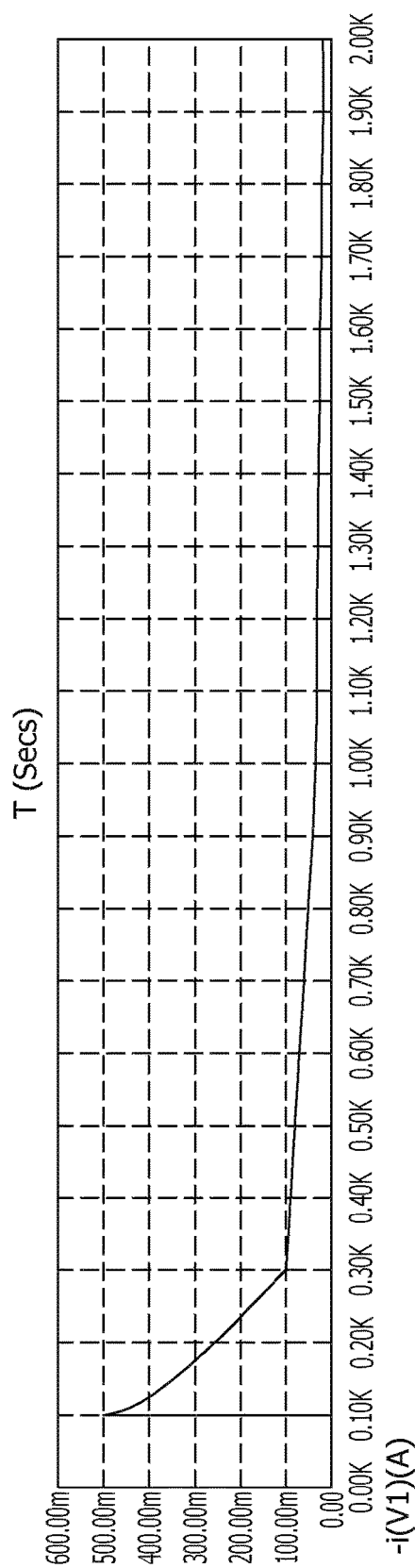
FIG. 10 is plot of current flowing into the device versus time as described in Example 1.
Figure 11:
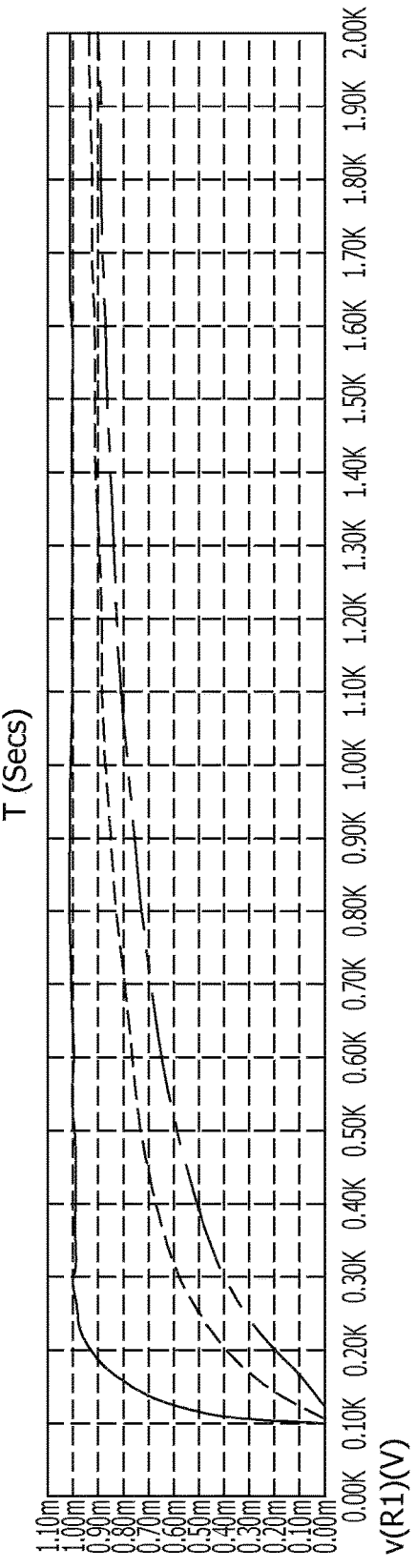
FIG. 11 is plot of the voltage across the electrochromic film at three locations (near the edge, near the center, and between these two) as described in Example 1.

The switching speed of this entire device can be increased by applying a more complex voltage waveform. Such a waveform along with its effect on the current and effect on switching dynamics is shown in FIGS. 9-11. The applied voltage pulse was selected to ramp up the voltage near the edge to a maximum, not to exceed 1.0 volts. This required that the voltage waveform quickly ramp up and then decrease the voltage in time as needed to keep the voltage across the device below 1.0 volts. This waveform is shown in FIG. 9. The current flowing out of the power supply is shown in FIG. 10 and shows a sharp initial current increase followed by a decreasing current over time following the decrease in applied voltage. FIG. 11 shows the voltage drop across the device near the edge of the device, part way towards the center of the device, and near the middle of the device from both contacts (6 traces in total). It can be seen that the device in this case switches near the edge of the device much faster than in the previous example, where the applied voltage was a step function. Near the center of the device the switching is still slow and while the whole device switches faster than in the previous case, the iris effect may be exacerbated as the voltage difference between the edge and the center is larger during part of the switching. Note that the switching is symmetric such that the curves corresponding to points located symmetrically opposite on the device switch identically and overlap. This iris effect can be reduced or eliminated by adjusting the sheet resistance distribution in the electron conductor layers of the multi-layer device as shown in the next example.

Example 2: Uniform Switching

Figure 12:
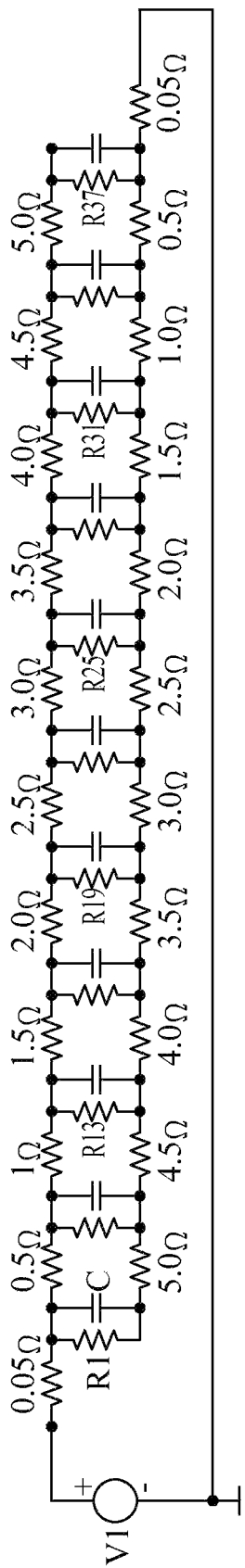
FIG. 12 is a 1-D lumped element circuit model diagram used to simulate dynamic behavior of an electrochromic device as described in Example 2.
Figure 13:
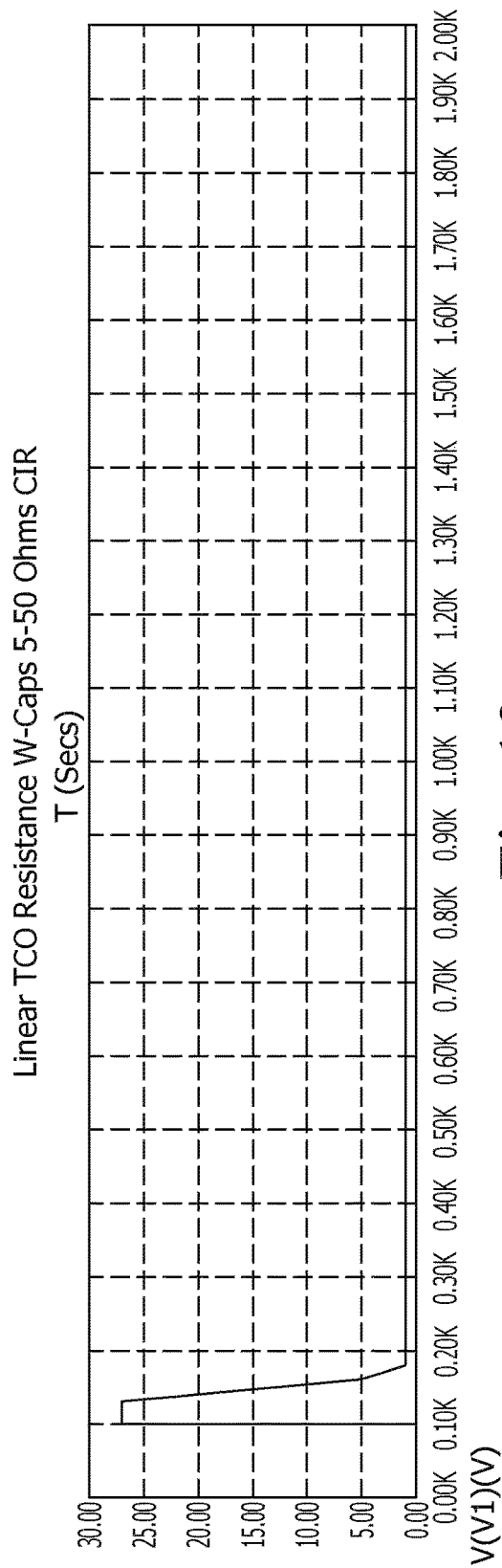
FIG. 13 is plot of the voltage waveform applied to the bus bars as described in Example 1.
Figure 14:
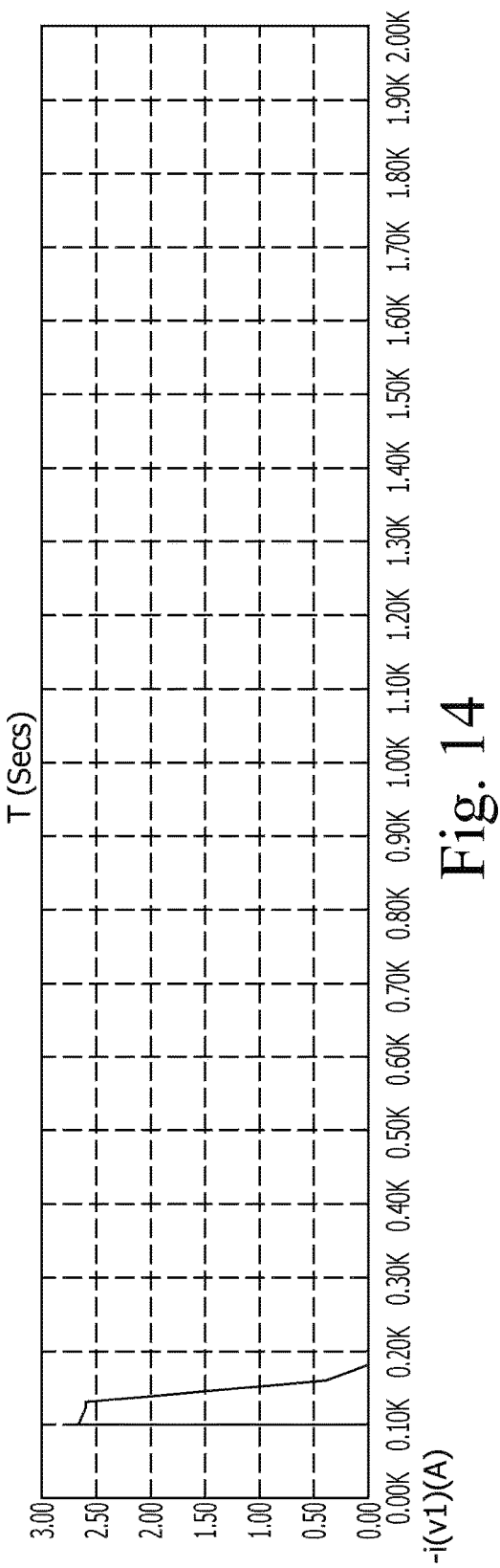
FIG. 14 is plot of current flowing into the device versus time as described in Example 1.
Figure 15:
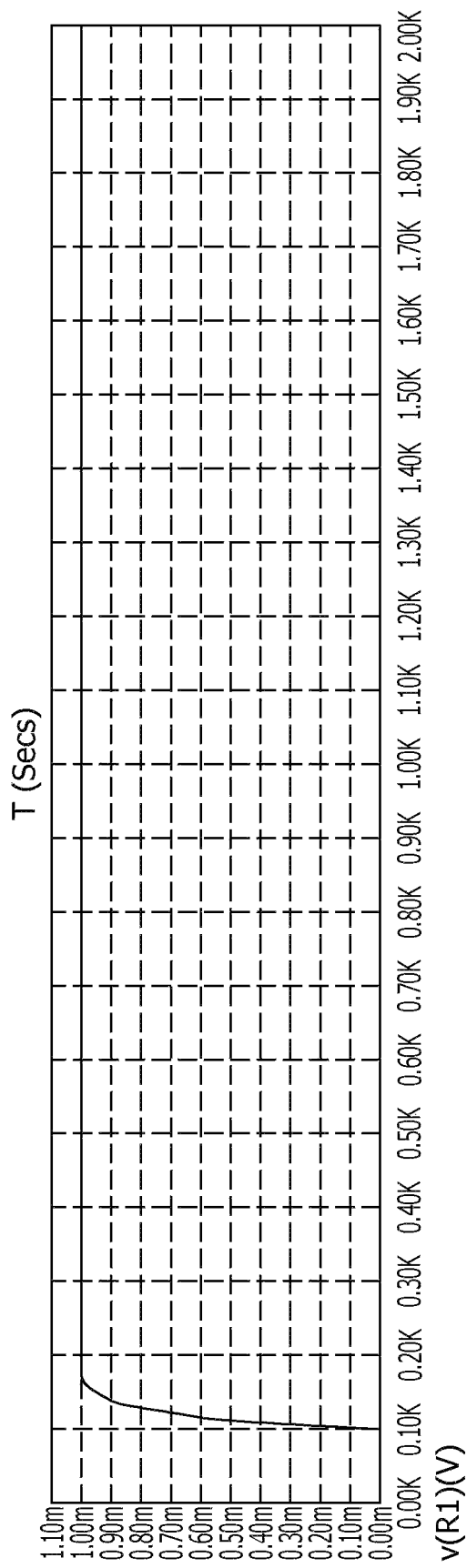
FIG. 15 is plot of the voltage across the electrochromic film at three locations (near the edge, near the center, and between these two as described in Example 1.

The 1-D circuit model shown in FIG. 12 embodies a constant gradient in sheet resistance in each of the electrically conducting layers. These are arranged such that the sheet resistance is lowest near the connection the power supply and highest at the opposite end of the device. One polarity of the power supply is applied to one electrically conducting layer and the other polarity of the power supply is applied to the opposing electrically conducting layer and at the opposite sides of the device. With this arrangement there is no iris effect and switching behavior is qualitatively different—providing both uniform switching across the entire device and much faster switching of the entire device. This switching behavior is shown in FIGS. 13-15. FIG. 13 shows the applied voltage waveform. This waveform was selected to limit the voltage across the device to always be below a desired threshold (in this example 1.0 volts). The resultant waveform is a voltage pulse with a fast rising leading edge and a slower falling edge selected to keep the voltage across the device below but near the desired threshold voltage. FIG. 14 shows the current flowing through the device as a function of time, the current ramps up quickly and has a waveform similar in shape to that of the applied voltage pulse. FIG. 15 shows the voltage drop across the electrochromic device at the edge of the device near the power supply contact and near the center of the device. As can be seen in this plot, the voltage profile across the device is the same at all locations. The result is that significant current can be driven through the device in a relatively short period of time while the voltage across the device is low and the same everywhere. Such a non-uniform sheet resistance in the electrically conducting layers can allow large area electrochromic devices to switch with dynamics similar to those of small area devices.

Example 3: Directional Switching

Figure 16:
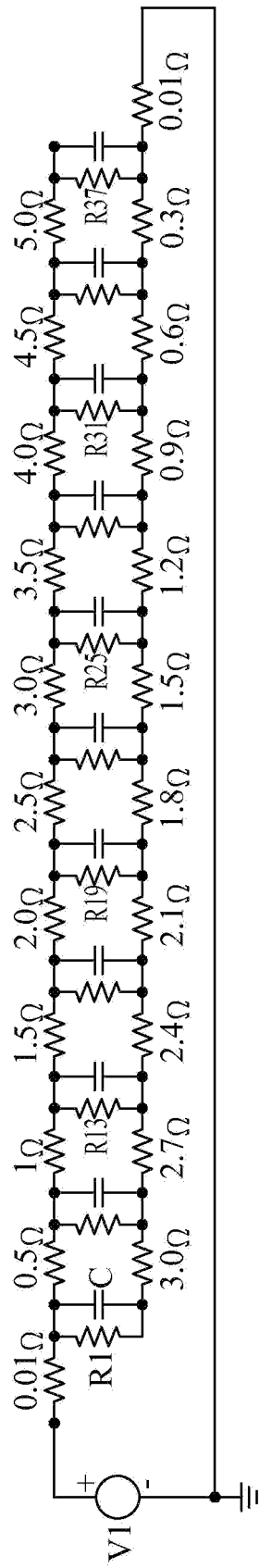
FIG. 16 is a 1-D lumped element circuit model diagram used to simulate dynamic behavior of an electrochromic device as described in Example 3.
Figure 17:
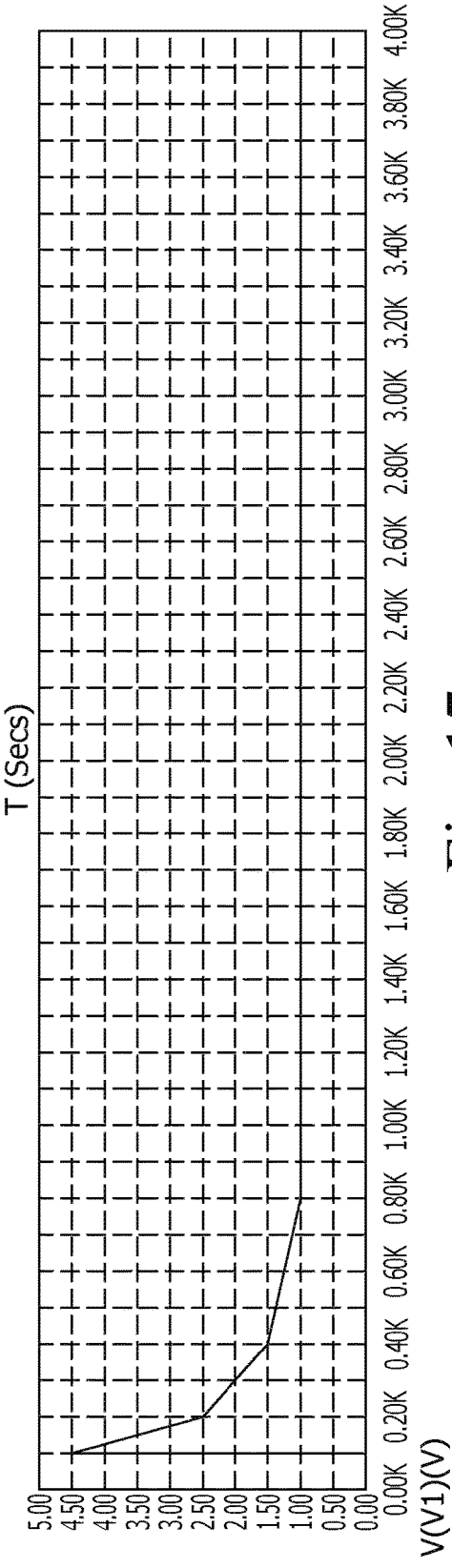
FIG. 17 is plot of the voltage waveform applied to the bus bars as described in Example 1.
Figure 18:
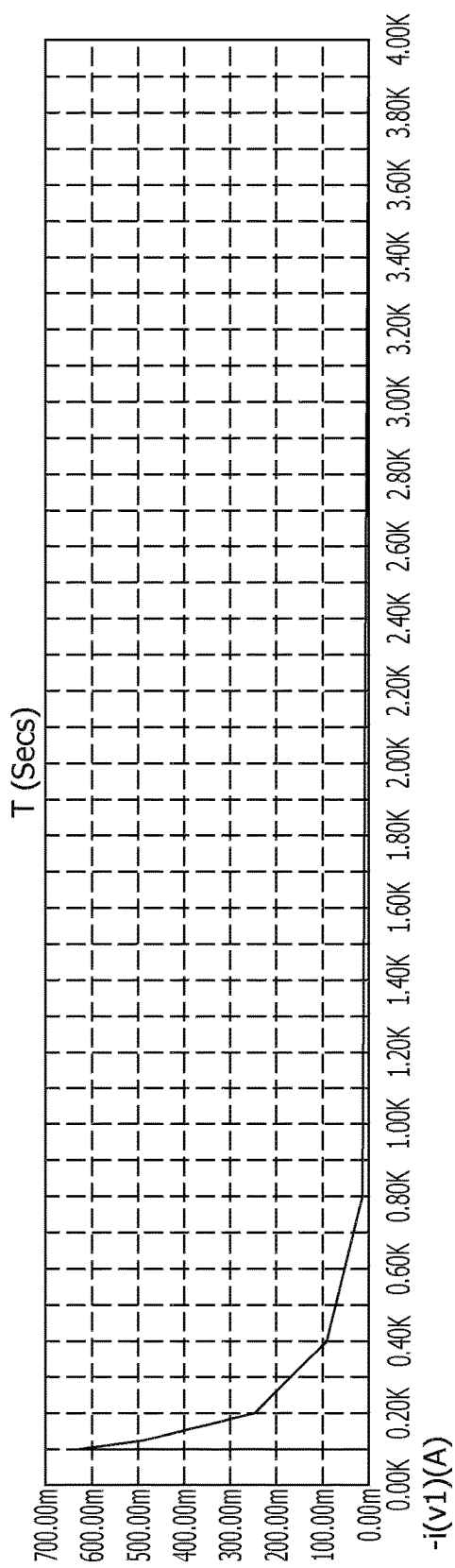
FIG. 18 is plot of current flowing into the device versus time as described in Example 1.
Figure 19:
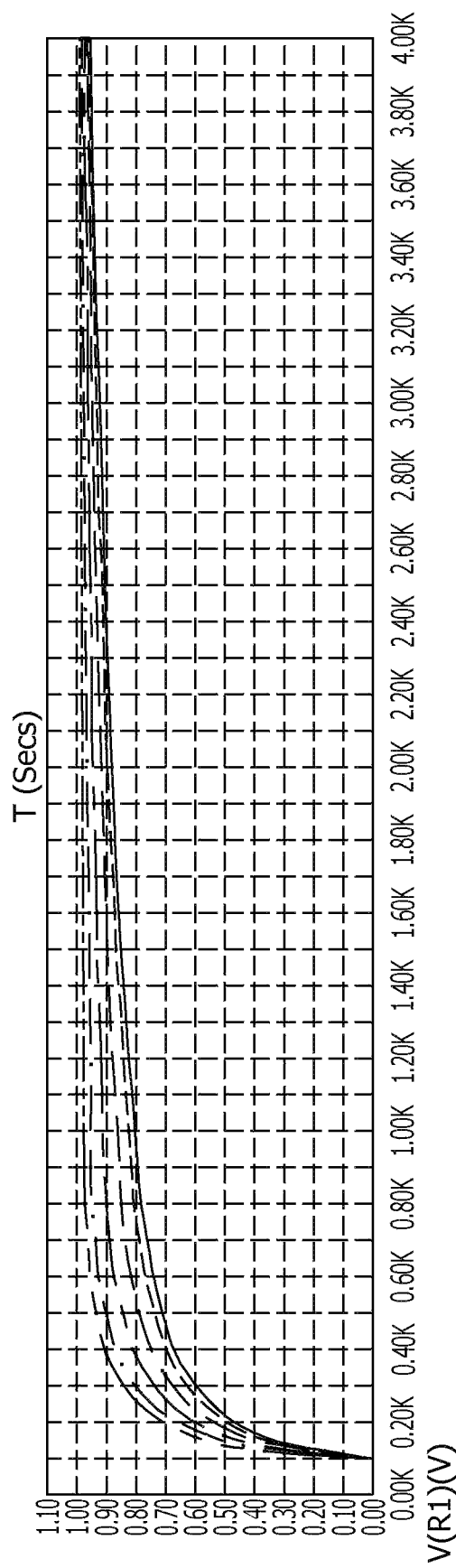
FIG. 19 is plot of the voltage across the electrochromic film at three locations (near the edge, near the center, and between these two) as described in Example 1.

The lumped element model in FIG. 16 is an example of a configuration that provides a controlled switching profile in an electrochromic device. In this case, the device will switch from left to right. The electrically conducting layers are asymmetric. The top electrically conducting layer is a layer with sheet resistance of 5Ω/□ at the left side and linearly increasing to 50Ω/□ at the right side of this layer. The bottom electrically conducting layer is a layer with sheet resistance of 30Ω/□ at the left side and linearly decreasing to 3Ω/□ at the right side of the layer. FIG. 17 shows the applied voltage waveform to product a rapidly rising voltage at the left side of the device while keeping this voltage across the device below 1.0 volts. FIG. 18 shows the corresponding current through the device which initially rapidly increases then quickly falls as the device switches. FIG. 19 shows the voltage across the device at six location from left to right. As can be seen, the voltage increases and approaches 1.0V at the far left side the fastest and at each point further right the voltage across the device increases and approaches 1.0V more slowly. This will result in a device that will switch from left to right in a pre-determined manner. This behavior can be controlled at window sizes that would exhibit an iris effect with a given constant sheet resistance in the electrically conducting layers. In addition the rate at which the apparent velocity of switching occurs from left to right can be controlled by the difference between the sheet resistance profiles in the electrically conducting layers. For example, if the lower electrically conducting layer in Example 3 was a layer with sheet resistance of 40Ω/□ at the left side and linearly decreasing to 4Ω/□ at the right side of the layer then the switching of the device in this case would be much faster from left to right. In the limiting case that that the sheet resistance profiles are linear and identical in opposing directions then the device will switch uniformly as demonstrated in Example 2.

Example 4 and Comparative Example 4A

All substrates for Example 4 and Comparative Example 4A (and Examples 5-7 and comparative examples), were 9×13.7 cm in dimension and between 2.3 and 4 mm thick.

Devices containing a single electrochromic electrode layer and a single ion conductor layer positioned between two electrically conductive layers located between two outer substrates of glass were prepared for the example and comparative example. Electrically conductive layers were tin doped indium oxide (ITO) transparent conductive oxide (TCO) layers sputter-coated on float glass substrates. Comparative Example 4A used ITO coated substrates with a uniform sheet resistance of 65Ω/□. Example 4 used ITO coated substrate with a linear increase in sheet resistance from 70-400Ω/□. The sheet resistance increased linearly in the 13.7 cm direction (i.e., a constant sheet resistance gradient) and was approximately uniform in the 9 cm direction. The ITO substrates were custom prepared for the work by sputtering onto bare float glass substrates. The procedure for fabrication of the devices is detailed below.

The sheet resistance of the ITO coated substrates was measured using a 4-point probe measurement tool. Sheet resistance measurements on the gradient resistance ITO substrates were made on at least at five equally spaced locations placed on a straight line with the line running perpendicular to the 9 cm sides of the substrate and with the measured locations covering the majority of the sheet resistance gradient.

A tungsten oxide precursor was prepared as follows. In a 0° C. ice bath, a 2 L flask was charged with 40 mL water and fitted with a stir bar. Then 800 mL of a 50:50 solution of aqueous hydrogen peroxide (30 wt. % $H_2O_2$) and glacial acetic acid was added and stirred 30 minutes to equilibrate to the ice bath temperature. To the cold mixture, 65 g of tungsten metal was added and stirred to react for 24 hours. The resulting solution was filtered through coarse (Whatman 54) and then fine (Whatman 42) filter paper to yield a clear, slightly yellow filtrate. The filtrate was then refluxed 18 hours at 55° C. and refiltered through fine (Whatman 42) filter paper, then dried under vacuum (using a water aspirator) at 65° C. to recover a powdered tungsten peroxy acid ester product.

The coating solution was prepared by dissolving 18 g of the solid tungsten peroxy acid precursor, 0.668 g lithium methoxide, and 2.367 g oxalic acid dehydrate in 60 mL anhydrous ethanol under an argon atmosphere in a glove box.

The coating solution was spin-coated onto the two TCO types (uniform sheet resistance and gradient sheet resistance).

Following coating, a strip of the coated film was removed from all sides of the substrate using water. This exposed the underlying TCO for electrical contacts and better adhesion. The films were processed with the following program in a humidity chamber.

| Step | Temperature ° C. | Relative Humidity (%) | Time (min) |
|---|---|---|---|
| 1 | 26 | 40 | 5 |
| 2 | 30 | 80 | 10 |
| 3 | 45 | 70 | 15 |
| 4 | 60 | 65 | 15 |
| 5 | 90 | 10 | 10 |
| 6 | 105 | 1 | 10 |
| 7 | 25 | 25 | 19 |

After removal from the humidity chamber, the films were processed in an oven in air with the following program to produce a tungsten oxide film.

| Step | Temperature ° C. | Time (min) |
|---|---|---|
| 1 | Ambient | 0 |
| 2 | Ramp to 240 | 60 |
| 3 | 240 | 60 |
| 4 | Ambient | 60 |

Final thickness was measured by a contact profilometer to be approximately 300 nm.

Two holes 4 mm in diameter were drilled into opposite corners of a set of ITO substrates (one uniform sheet resistance ITO and one gradient sheet resistance ITO). The devices were then constructed by hermetically sealing matching substrates together using thermal-set epoxy around the outside edge with the conductive surfaces facing inward (e.g., two uniform sheet resistance ITO substrates were used in a single device while two gradient sheet resistance ITO substrates were used in another device). A fixed gap width of 210 μm was set by mixing glass beads with a known diameter into the epoxy. The substrates were shifted relative to each other to produce an overlap of approximately 0.5 cm in all directions to permit electrical connections and electrical measurements. Busbars for electrical contact were soldered onto the overlapping sections on the short sides of the device (i.e., 9 cm sides). The gradient ITO device was assembled with the gradients opposing each other and with their low sheet resistance sides serving as the busbar area for contacts (i.e., the low sheet resistance side of each substrate was aligned to face the high sheet resistance side of the other and both low sides positioned to be exposed.)

The prepared devices were filled through the drilled holes with an ion conductor solution of 0.5 M lithium triflate and 0.05 M ferrocene in anhydrous propylene carbonate. The holes were then sealed. In these devices the ferrocene in the ion conductor layer acts as a species capable of reversibly oxidizing and reducing upon the insertion or withdraw of electrons.

Analysis and characterization of the completed devices was carried out using a custom lab instrument. The instrument permitted simultaneous control of the voltage source, measurement of transmission across the electromagnetic spectrum at various points in the device, and voltage potential across the electrochemical stack at various points. This allows full characterization of the device and links voltage potential in the electrochromic stack at a particular point in the device to electromagnetic transmission at that same point. For example, a device could be characterized with a pre-set voltage pulse profile and simple measurement of voltage and optical data. Additionally, the device could be characterized with the voltage pulse adjusting to maintain a target voltage potential in the electrochromic stack.

The devices of Comparative Example 4A and Example 4 were characterized. Data showing variations in voltage and transmission values are presented below. The "Iris" value is the maximum difference in transmission at 550 nm between an area near the edge and the center of the device measured while switching the device from bleached to colored states. The Maximum Voltage Δ is the maximum difference in voltage potential across the electrochromic stack near the edge and the center of the device while switching the device from bleached to colored states. The source voltage was automatically adjusted to maintain 1.2 volts across the electrochromic stack at the edge of the device. Total time to steady state was approximately 150 seconds in each case.

| | Maximum Voltage Δ | Maximum Iris Value (ΔT at 550 nm) |
|---|---|---|
| Comparative Example 4 | 0.64 V | 31% |
| Example 4 | 0.25 V | 6% |

Example 5 and Comparative Example 5A

Devices comprising two electrochromic electrode layers, positioned on each side of a single ion conductor layer with each electrochromic electrode layer positioned against an electrically conductive TCO layer and with each TCO layer arranged against an outer substrate of glass were prepared for the example and comparative example. Comparative Example 5A used ITO coated substrates with a uniform sheet resistance of approximately 220Ω/□. Example 5 used ITO coated substrates with a constant gradient in sheet resistance from approximately 100-500Ω/□. The gradient device was constructed with the substrates oriented as in Example 4. The ITO was custom sputter deposited for the project and then thermally processed to increase its sheet resistance. Sheet resistance measurements were taken on deposited electrode films following thermal processing and just prior to insertion into a final device.

The sheet resistance of the ITO coated substrates was measured using a 4-point probe measurement tool. Sheet resistance measurements on the uniform ITO coated substrates were made at several points on the film. Sheet resistance measurements on the gradient sheet resistance ITO substrates were made on at least five equally spaced locations on a straight line with the line running perpendicular and between the two 9 cm sides of the substrate. It was observed that the sheet resistance of the ITO would vary due to thermal treatment and application of an electrode film. A correction factor was applied to the sheet resistance measurements after thermal treatment or application of an electrode film. The correction factor was calculated by measuring the overall sheet resistance of the substrate between two points placed at the mid-point of each 9 cm side and offset from the edge by approximately 0.5 cm and ensuring measurement on exposed TCO. The correction factor was then the ratio of this overall sheet resistance of the substrate from before and after the treatment. For example, if this sheet resistance increased from 100Ω to 150Ω due to a thermal treatment and the original measured sheet resistance in Ω/□ was 200Ω/□ then the reported sheet resistance in Ω/sq after thermal treatment was 300 Ω/□.

Tungsten oxide films were prepared as in Example 4 on the two substrate types (i.e., one uniform sheet resistance and one gradient sheet resistance substrate). The tungsten oxide films served as the first electrode layers.

Complimentary vanadium oxide xerogel films were prepared on the two substrate types. Two holes 4 mm in diameter were drilled into opposite corners of this set before coating. The vanadium oxide films served as the second electrode layer.

The vanadium oxide xerogel coating proceeds by acidification of $LiVO_3$ by cation exchange followed promptly by spin coating before gelation of the resulting vanadic acid can occur. The procedure for the coating solution is as follows.

A 2 M $LiVO_3$ precursor solution was prepared by dissolving 8.08 g $LiVO_3$ in 34 mL 40% vol aqueous ethanol by stirring at 60° C. for 1 hour. The cloudy solution was filtered (Whatman 40), and the filter rinsed with 40% ethanol. The filtrate was diluted to 40 mL and shaken to mix yielding a slightly yellow, viscous 2 M $LiVO_3$ solution.

The flash ion exchange columns were prepared by packing 2 mL (3.4 meq) of Dowex WX8 100-200 mesh cation exchange resin (proton form) into a 3 mL syringe fitted with a 0.2 micron PTFE Acrodisk filter to retain the resin beads. The columns were rinsed twice with water and then drained. One milliliter of the $LiVO_3$ solution was added to a packed syringe, which was shaken ten seconds to mix into the resin. The "column" was eluted by depressing the syringe plunger and the bright orange vanadic acid solution was immediately refiltered (0.2 micron PTFE Acrodisk) onto the substrate and spun to form the coating. Following coating, a strip of the coated film was removed from all sides of the substrate using a water treatment. This exposed the underlying TCO for electrical contacts and better adhesion.

The resulting films were thermally processed using the following recipe to produce a vanadium oxide film.

| Step # | Procedure              | Time        |
|--------|------------------------|-------------|
| 1      | Heat 25° C. to 240° C. | 60 minutes  |
| 2      | Hold at 240° C.        | 60 minutes  |
| 3      | Cool 240° C. to 40° C. | 120 minutes |

Final thickness was measured by a contact profilometer to be approximately 100 nm.

The vanadium oxide films were lithiated in a glove box using a lithium metal counter-electrode and a solution of 1 M lithium perchlorate in propylene carbonate. A two-step procedure involving oxidation to 3.8V followed by reduction at 2.4 V was performed with the voltages quoted versus reference lithium metal. Lithiation was performed to put the vanadium oxide into a state of reduction that allows it to serve as the counter-electrode to the tungsten oxide films.

The devices were then constructed by hermitically sealing matching substrates together using an acrylic adhesive tape with the conductive surfaces facing inward. A fixed gap width of 500 μm was set by the adhesive tape. Acrylic adhesive tape was used for rapid device creation. The substrates were shifted relative to each other to produce an overlap of approximately 0.5 cm in all directions to permit electrical connections and measurements. The gradient device was assembled as in Example 4 with the low sheet resistance sides exposed for electrical contact.

The prepared devices were filled through the drilled holes with an electrolyte solution of 1.5 M Lithium Bis(trifluoromethanesulfonyl)imide in anhydrous propylene carbonate. The holes were then sealed.

The Example 5 and Comparative Example 5A devices were analyzed with the custom setup described in Example 4. The results are shown below

| Source voltage | Switching time (bleached to colored) | Maximum Voltage Δ | Iris Value (ΔT at 550 nm) |
|---|---|---|---|
| Comparative Example 5A. Electrochemical stack at edge of device controlled to 1.2 V | 150 seconds | 1.4 V | 17% |
| Example 5. Electrochemical stack at edge of device controlled to 1.2 V | <100 Seconds | 0.3 V | 6% |

As demonstrated by the results, the device of Example 5 significantly mitigated the Iris value while achieving a faster switching speed than the device of Comparative Example 5A.

Example 6

A device was prepared containing two electrochromic electrode layers, positioned on each side of a single ion conductor layer with each electrochromic electrode layer positioned against an electrically conductive TCO layer and with each TCO layer arranged against an outer substrate of glass. The device of this example 6 used TEC 70 substrates (Pilkington) with two laser scribed patterns. TEC glass is commercially available fluorine doped tin oxide (FTO)

where the number in the name indicates the sheet resistance in Ω/□. FTO is a TCO. The laser scribed patterns increase and modulate the sheet resistance of the TCO. The first TEC substrate had a laser pattern that simulated a uniform sheet resistance of 250Ω/□. The second TEC substrate had a laser scribe pattern that simulated a linear increase in sheet resistance from 170-1500Ω/□ substrate.

The sheet resistance of scribed TEC glass substrates was calculated by measuring the sheet resistance between two points spaced one cm apart on the substrate. The same measurement was performed on a set of un-scribed TEC glass with a known sheet resistance value in Ω/□. From the un-scribed TEC measurements a calibration curve was calculated relating Ω/□ to the 2-point sheet resistance value. A sheet resistance value in Ω/□ was then calculated for each measurement on the scribed TEC glass substrates. The second TEC glass substrate sheet resistance profile was measured by taking individual measurements at 1 cm intervals in a straight line between and perpendicular to the two 9 cm sides of the substrate.

The device should be compared with Example 3. Example 3 describes a lumped element model of an electrochromic device with a directional switch. This directional switch is achieved in Example 3 by an asymmetry in the electrically conductive layer (e.g., the TOO). The device of Example 6 has an asymmetry in the two electrically conductive layers and was expected to show a directional switch where the device switches faster on the low sheet resistance side of the second TEC substrate and slower on the high sheet resistance side of the second TEC substrate.

The device was constructed using the procedure described below.

The tungsten oxide film was prepared as in Example 4 on the second TEC substrate (with gradient sheet resistance). The tungsten oxide film served as the first electrode layer.

A complementary vanadium oxide film was prepared on the first TEC substrate (uniform sheet resistance). The vanadium oxide film served as the second electrode layer. Two holes approximately 4 mm in diameter were drilled into opposite corners of the uniform sheet resistance substrate before coating. The coating solution was prepared according to the following recipe.

A solution of LiVO$_3$ was prepared by dissolving the solid in 5% wt solution in water at 60° C., followed by filtration through Whatman 40 paper. The vanadate species were protonated to "vanadic acid" by running this 5% wt solution of LiVO$_3$ dropwise through an ion exchange column packed with at least 20 equivalents of Dowex Monosphere 650C in H$^+$ form, eluting with additional deionized water until a pale yellow endpoint. The eluted vanadic acid was allowed to stand overnight, after which it was sonicated to disperse any solids that had formed.

Six equivalents of triethylamine were added to the vanadic acid and the mixture was sonicated at 40-50° C. for one hour to form a colorless, slightly turbid. This solution was evaporated under reduced pressure at up to 55° C. to yield a yellow viscous liquid. This was dissolved in ethanol or 2-methoxyethanol to between 0.4 M vanadium and 1.2 M vanadium to yield a final coating solution.

The coating solution was spin-coated onto the substrate. Following coating, a strip of the coated film was removed from all sides of the substrate using a water treatment. This exposed the underlying TCO for electrical contacts and better adhesion. The film was thermally processed using the following recipe in air to produce a vanadium oxide film.

| Step # | Procedure | Time |
|---|---|---|
| 1 | Heat 25° C. to 350° C. | 60 minutes |
| 2 | Hold at 350° C. | 60 minutes |
| 3 | Cool 350° C. to 40° C. | 120 minutes |

Final thickness was measured by a contact profilometer to be approximately 200 nm.

The vanadium oxide film was lithiated in a glove box using a lithium metal counterelectrode and a 1 M solution of lithium perchlorate in propylene carbonate. The voltage during lithiation was 2.7 to 2.9 volts versus lithium metal. Lithiation was performed to put the vanadium oxide into a state of reduction that allows it to serve as the counterelectrode to the tungsten oxide film.

The devices were then constructed by hermetically sealing matching substrates together using thermal setting epoxy around the outside edge with the conductive surfaces facing inward. A fixed gap width of 210 μm was set by mixing glass beads of a known diameter into the epoxy. The substrates were shifted relative to each other to produce an overlap of approximately 0.5 cm in all directions to permit electrical connections and measurements. The device was constructed with the gradient substrate oriented with the low sheet resistance side exposed for electrical connection.

The prepared devices were hydrated in a humidity chamber at 25% relative humidity at 25° C. for 2 hours. The prepared devices were then filled through the drilled holes with an electrolyte solution of 1.5 M Lithium Bis(trifluoromethane-sulfonyl)imide in anhydrous propylene carbonate. The holes were then sealed.

The device of Example 6 was characterized and demonstrated a pronounced directional change effect where the device switched from bleached to colored states substantially faster on the low sheet resistance side of the second TEC substrate than the high sheet resistance side of the second TEC substrate. The difference in transmission exceeded 25% during coloration. This directional change qualitatively agreed with the prediction made in Example 3.

Example 7 and Comparative Example 7A

Devices were made containing two electrode one of which being electrochromic, positioned on each side of a single ion conductor layer with each electrode layer positioned against an electrically conductive TCO layer and with each TCO layer arranged against an outer substrate of glass. The device of Comparative Example 7A used TEC 70 substrates (Pilkington) with a laser scribed pattern to simulate 250Ω/□ sheet resistance. The laser scribed patterns increase and modulate the sheet resistance of the TCO. The device of Example 7 used TEC 70 substrates with a laser scribed pattern that simulated a 70-250Ω/□ substrate. Sheet resistance values were calculated as in Example 6. The device was constructed with the substrates oriented with opposing sheet resistance gradients as in Example 4. All devices were constructed using the procedure described below.

A 20 wt % colloidal dispersion of cerium oxide coating solution in an aqueous solution (Alfa Aesar) was spin-coated onto a set of the laser scribed FTO substrates. Following spin-coating, a strip of the cerium oxide film was removed from all sides using an acetic acid solution (aq., 2.5 wt %). The film was thermally processed for one hour at 240° C. in air.

Final thickness was measured by profilometry to be approximately 350 nm.

The cerium oxide films served as the first electrode layer.

Complementary vanadium oxide films were prepared on the same set of substrates. The vanadium oxide films served as the second electrode layer and is electrochromic. Two holes 4 mm in diameter were drilled into the corners of this set before coating. The vanadium solution was prepared according to the following procedure.

A 2 M $LiVO_3$ precursor solution was prepared by dissolving 8.08 g $LiVO_3$ in 34 mL 40% vol aqueous ethanol by stirring at 60° C. for 1 hour. The cloudy solution was filtered (Whatman 40), and the filter rinsed with 40% ethanol. The filtrate was diluted to 40 mL and shaken to mix yielding a slightly yellow, viscous 2 M $LiVO_3$ solution.

Twenty milliliters of this $LiVO_3$ solution was acidified by the addition of between 4.5 and 6 g Dowex Monosphere 650C cation exchange resin (proton form) under vigorous stirring. The resulting bright orange mixture was filtered through filter paper (Whatman 40) and then diluted with 6.6 mL water to yield the final coating solution.

The coated films were thermally processed one hour at 240° C. in air to yield a vanadium oxide film. Final thickness was measured by a contact profilometer to be approximately 150 nm.

The vanadium oxide films were lithiated in a glove box using a lithium metal counterelectrode and a solution of 1 M lithium perchlorate in propylene carbonate. A two-step procedure involving oxidation to 3.8V followed by reduction at 2.4 V was performed with the voltages quoted versus reference lithium metal. Lithiation was performed to put the vanadium oxide into a state of reduction that allows it to serve as the counter-electrode to the cerium oxide films.

The devices were then constructed by hermetically sealing matching substrates together using acrylic adhesive tape around the outside edge with the conductive surfaces facing inward. A fixed gap width of 500 μm was set by the adhesive tape. The substrates were shifted relative to each other to produce an overlap of approximately 0.5 cm in all directions to permit electrical connections and measurements. The gradient device was assembled as in Example 4 with the low sheet resistance sides exposed for electrical contact.

The prepared devices were then filled through the drilled holes with an electrolyte solution of 1.5 M Lithium Bis(trifluoromethanesulfonyl)imide in anhydrous propylene carbonate. The holes were then sealed.

The Iris Value for these devices was measured at 450 nm. This wavelength was used as it showed a larger change in transmittance between the bleached and colored states than 550 nm.

| Source voltage | Switching time (bleached to colored) | Maximum Voltage Δ | Iris Value (ΔT at 450 nm) |
|---|---|---|---|
| Comparative Example 7A. Electrochemical stack at edge of device controlled to 2 V. | >180 seconds | 1.6 V | 6% |
| Example 7. Electrochemical stack at edge of device controlled to 2 V. | 75 seconds | 0.3 V | 3% |

The gradient device achieved more uniform switching and significantly faster switching speed.

The invention claimed is:

1. A method of forming an electrochromic device, comprising:
    forming a first electrically conductive layer on a first substrate, and a first electrode layer on the first electrically conductive layer, wherein the first electrode layer comprises a first electrochromic material;
    forming a second electrically conductive layer on a second substrate, and a second electrode layer on the second electrically conductive layer, wherein the second electrode layer comprises a second electrochromic material, and
    coupling the first and second electrodes together using an ion conductor layer located between the first and second electrodes to form the electrochromic device,
    wherein:
    the electrochromic device is switchable from a more transmissive state to a less transmissive state;
    the first and second electrically conductive layers have sheet resistances to the flow of electrical current through the first and second electrically conductive layers that vary as a function of position in the first and second electrically conductive layers, respectively; and
    the sheet resistances of the first and second electrically conductive layers are asymmetric to one another and cause the electrochromic device to have a directional switch.

2. The method of claim 1, further comprising:
    forming a first bus bar coupled to the first electrically conductive layer located along a first side of the electrochromic device; and
    forming a second bus bar coupled to the second electrically conductive layer located along an opposing side of the electrochromic device;
    wherein the directional switch occurs from the first side to the opposing side across the electrochromic device.

3. The method of claim 1, wherein an apparent velocity of the directional switch is controlled by a difference between sheet resistance profiles in the first and second electrically conducting layers.

4. The method of claim 1, wherein the first and second electrically conductive layers are patterned, and patterns cause the flow of electrical current through the first electrically conductive layer to vary as a function of position in the first and second electrically conductive layers.

5. The method of claim 1, further comprising a thermal processing step to change the resistance of the first electrically conductive layer causing the flow of electrical current through the first electrically conductive layer to vary as a function of position in the first electrically conductive layer, wherein the thermal processing step occurs after the first electrically conductive layer is formed and before the first electrode layer is formed.

6. The method of claim 1, wherein a contour map of the sheet resistance within the first electrically conductive layer contains a set of isoresistance lines and a set of resistance gradient lines normal to the isoresistance lines, and the sheet resistance along a gradient line in the set generally increases, generally decreases, generally increases until it reaches a maximum and then generally decreases, or generally decreases until it reaches a minimum and then generally increases.

7. The method of claim 1, wherein a contour map of the sheet resistance within the second electrically conductive layer contains a set of isoresistance lines and a set of resistance gradient lines normal to the isoresistance lines, and the sheet resistance along a gradient line in the set generally increases, generally decreases, generally increases until it reaches a maximum and then generally decreases, or generally decreases until it reaches a minimum and then generally increases.

8. The method of claim 1, further comprising providing a power supply in electrical contact with the first and second electrically conductive layers, wherein:
   the power supply provides an electric potential to the first and second electrically conductive layers to switch the electrochromic device from a first optical state to a second optical state: and
   the second optical state is an intermediate state.

* * * * *